United States Patent [19]

Katz et al.

[11] 4,319,964

[45] * Mar. 16, 1982

[54] APPARATUS FOR HIGH VOLUME DISTILLATION OF LIQUIDS

[76] Inventors: Jerome Katz; Sidney J. Fogel, both of Rochester, Monroe County, N.Y.

[*] Notice: The portion of the term of this patent subsequent to Jul. 12, 1994, has been disclaimed.

[21] Appl. No.: 65,501

[22] Filed: Aug. 10, 1979

Related U.S. Application Data

[60] Division of Ser. No. 769,291, Feb. 22, 1977, Pat. No. 4,186,060, which is a continuation-in-part of Ser. No. 681,290, Apr. 28, 1976, Pat. No. 4,035,243.

[51] Int. Cl.³ .............................................. C02F 1/06
[52] U.S. Cl. .................................. 202/172; 202/162; 202/173; 202/180; 202/182; 203/11; 203/26; 203/100; 203/DIG. 14; 203/DIG. 16; 203/DIG. 17; 203/DIG. 20
[58] Field of Search ....................... 203/26, 24, 11, 92, 203/95, 100, DIG. 14, DIG. 16, DIG. 20, DIG. 8, 73; 202/162, 160, 173, 180, 170, 172, 234, 182; 60/39.58, 648, 649; 159/24 R

[56] References Cited

U.S. PATENT DOCUMENTS

| | | | |
|---|---|---|---|
| 1,461,640 | 7/1923 | Wirth-Frey | 203/26 |
| 2,441,361 | 5/1948 | Kirgan | 203/26 |
| 3,236,748 | 2/1966 | Pottharst | 203/11 |
| 3,288,685 | 11/1966 | Kemper et al. | 203/26 |
| 3,334,023 | 8/1967 | Fritz | 202/173 |
| 3,336,207 | 8/1967 | Peterson | 203/26 |
| 3,423,293 | 1/1969 | Holden | 203/26 |
| 3,607,663 | 9/1971 | Vandenberg | 203/26 |
| 3,607,668 | 9/1971 | Williamson | 202/173 |
| 3,649,469 | 3/1972 | MacBeth | 202/173 |
| 3,681,920 | 8/1972 | Margen | 202/173 |
| 4,035,243 | 7/1977 | Katz et al. | 203/DIG. 14 |

Primary Examiner—Wilbur L. Bascomb, Jr.
Attorney, Agent, or Firm—Sixbey, Friedman & Leedom

[57] ABSTRACT

A method and apparatus for high volume distillation of impure liquid comprises evaporating the impure liquid in an evaporator to form a vapor at a temperature above the freezing point and below the boiling point of said liquid at atmospheric pressure and at a pressure not exceeding a pressure corresponding to the evaporation temperature under saturated conditions; compressing the vapor; passing a portion of the compressed vapor through an expansion engine to do work upon and motivate the engine and to produce shaft energy, whereby the vapor expands and cools; bypassing the expansion engine with the remainder of the compressed vapor and admixing the remainder directly with the expanded vapor from the expansion engine in a mixing chamber; adding work to the expansion engine to supplement the work done by the vapor expanding therethrough to make up for work lost when the remainder of the compressed vapor bypassed the expansion engine and for other work lost; cooling the admixed vapor in heat transfer relation with the impure liquid whereby the vapor at least partially condenses, transferring sufficient heat to the impure liquid for evaporating the liquid and to form the aforementioned vapor; and collecting the condensed vapor. Work may be added to the expansion engine by mechanical means, such as motor means, drivingly linked to the engine, by admixing hot gases directly with the compressed vapor passing through the expansion engine, by a combination of direct mechanical drive and direct mixing of hot gases, or by other suitable means. To add flexibility to the system, the admixed vapor leaving the mixing chamber can be compressed in an independently driven compressor to a predetermined pressure corresponding a predetermined temperature differential between the compressed admixed vapor and the impure liquid.

58 Claims, 15 Drawing Figures

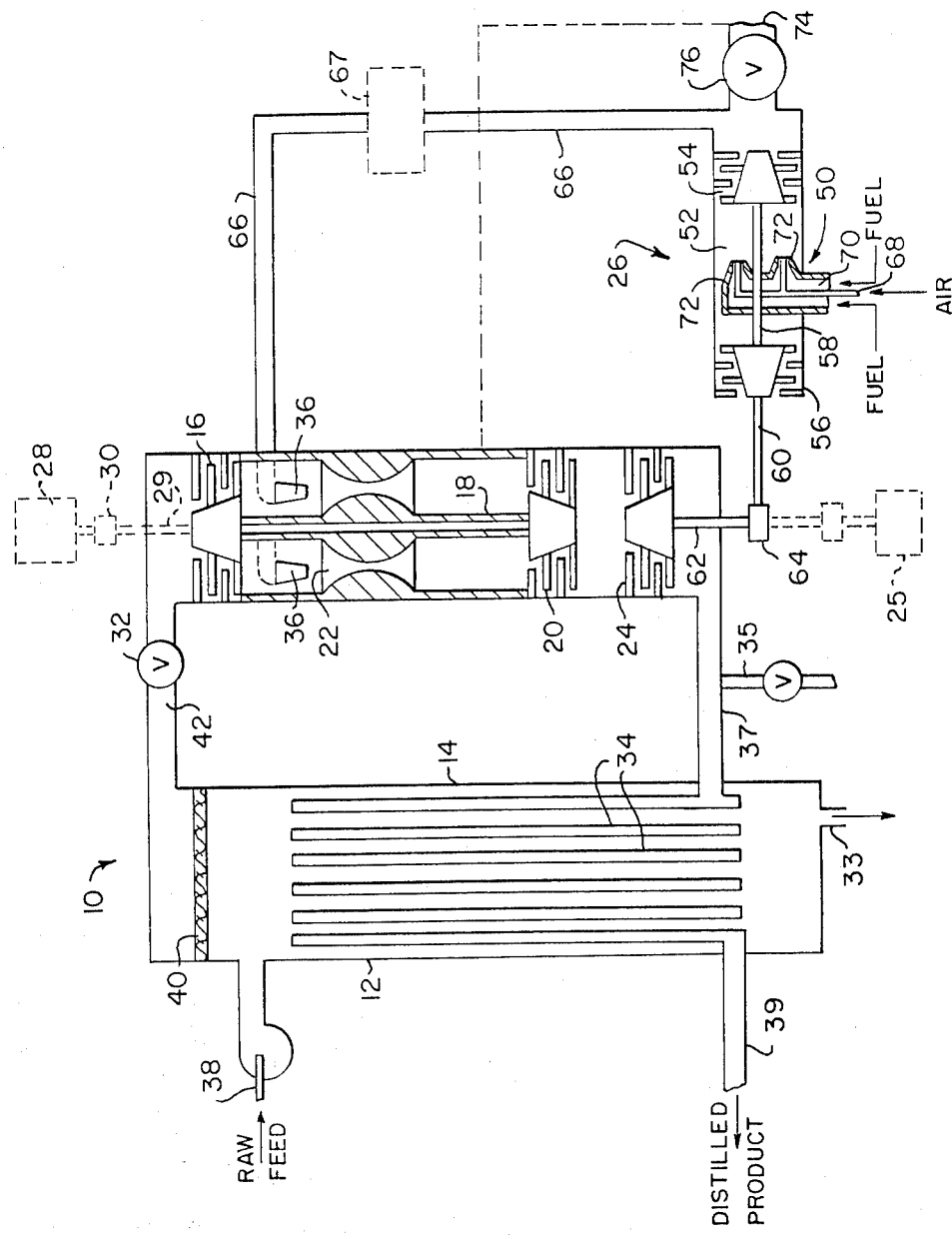

APPARATUS FOR HIGH VOLUME DISTILLATION OF LIQUIDS

This is a division of application Ser. No. 769,291, filed Feb. 22, 1977, now U.S. Pat. No. 4,186,060 which application is a continuation-in-part of application Ser. No. 681,290, filed Apr. 28, 1976, now U.S. Pat. No. 4,035,243.

The present invention relates to a method and apparatus for economically and efficiently purifying and recovering high quality water from waste water and, more particularly, to a method and apparatus which permits evaporation and vapor compression treatment of large volumes of impure water.

The need for very large volumes of high quality water arises in many contexts. Many industries require large quantities of good quality water as input or raw material in order to operate. For example, the paper or textile industries utilize tremendous volumes of such water for their dyeing and bleaching operations. Many more industries discharge large quantities of waste or contaminated aqueous solutions to the environment. However, with the continuing decline in quality of the water in our lakes, rivers and streams and the continuing promulgation by federal, state and local governments of statutes and ordinances regulating the quality of water dumped into waterways, there is an increasing need for economical methods by which industrial waste streams can be cleaned prior to discharge. Still another area which requires the treatment of large volumes of water in an efficient and economical fashion is the production of potable water from the oceans by desalination. A related area for treatment of large volumes of water is the treatment of sea water into which oil has been spilled to recover the oil and to desalinate or purify the water. Thus, the problem of waste water treatment in high volumes includes the treatment of impure water as well as sea or brackish water. It also includes the treatment of water containing inorganic or organic impurities or materials where it is desired to separate and recover the water and/or to separate and recover the materials. In a broader sense the problem is not limited to water or aqueous solutions but extends to non-aqueous solutions as well where the components can be substantially separated by the method of distillation. Therefore, all possible feed solutions for liquid separation of the solvent from other constituents of the solution, whether the solvent is aqueous or not, are encompassed within the term "impure liquid" as used herein.

There have been endless suggestions for treating industrial waste and sea water, including multistage distillation plants, thermo-mechanical distillation systems, and the like. However, any system heretofore suggested which has been capable of treating the millions of gallons per day necessary to effectively deal with industrial waste or to produce meaningful quantities of potable water have been hopelessly impractical or uneconomical in terms of their capital equipment or energy requirements. A good illustration of this is the system disclosed in U.S. Pat. No. 3,423,293 to Holden, which is a thermo-mechanical system for distilling impure waste at one atmosphere. The Holden system includes, sequentially, a boiler for evaporation of the water, a compressor, heat exchange means for adding heat to the compressed vapor, a turbine motor for driving the compressor and a condenser unit for extracting the heat of vaporization from the vapor and for transferring this extracted heat to the impure feed liquid at one atmosphere. Although Holden makes a seemingly appealing case for the economics of his system, when practical thermodynamic considerations are imposed it becomes apparent that in order to treat large volumes of water in the Holden system, e.g., 1,000,000 gal/day or 125,000 gal/hr, would require about 1,250,000 $ft^2$ of condenser heat transfer area. using commercially available condensers, this means that a typical 20 inch wide condenser would have to be 18,266 feet long. If the condenser size were increased to 5 feet wide, a condenser length of 2,031 running feet would be required. The capital costs involved in building a support structure for such a condenser unit are too impractical to consider. Other patents which teach or disclose water distillation systems and which may be of some interest in connection with the present invention are the following U.S. Pat. Nos.: 1,230,417; 1,594,957; 2,280,093; 2,515,013; 2,537,259; 2,589,406; 2,637,684; 3,412,558; 3,423,293; 3,425,914; 3,351,537; 3,440,147; 3,444,049; 3,476,654; 3,477,918; 3,505,171; 3,597,328; 3,477,918; 3,505,171; 3,597,328; 3,607,553; 3,649,469; 3,856,631; 3,879,266.

It is therefore an object of this invention to provide an economical yet practical system for high volume purification of impure liquid sources.

It is another object of this invention to provide a thermo-mechanical distillation system capable of purifying large volumes of impure liquids and converting them to potable, or at least dumpable, liquid without imposing unreasonable equipment or energy requirements.

It is still another object of the invention to provide a heat and work input system wherein maximum heat and work input efficiencies are practiced.

It is yet another object of this invention to provide a system capable of purifying millions of gallons per day of waste water while at the same time providing a thermal energy reserve which can be used as such or converted to mechanical or electrical energy.

It is another object of the invention to provide a method of liquid distillation and recovery of the liquid in purified form by evaporation-vapor compression techniques using a turbine compressor in axial combination with a turbine motor, and a means for bypassing the turbine motor with at least a portion of the fluid flow, all in conjunction with a latent heat regenerative evaporative boiler.

Other objects and advantages will become apparent from the following description and appended claims.

Briefly stated, in accordance with the aforesaid objects the present invention comprises a method, and a system for practicing the method, for purifying large volumes of impure liquid by evaporating the liquid in a boiler under reduced pressure, substantially adiabatically compressing the resulting vapor to a pressure substantially in excess of the vaporization pressure, directing a portion of the compressed vapor through and substantially adiabatically expanding the vapor in a turbine, bypassing the turbine with the remainder of the compressed vapor and admixing this remainder with the turbine exhaust vapor to form a resulting vapor at ambient pressure and at a temperature greater than that of the turbine exhaust vapor but less than that of the compressed vapor prior to admixing, adding sufficient makeup work to the turbine such that the added work plus the work done by the vapor passing therethrough at least equals the work done by the compressor on the vapor, and passing the resulting vapor through a condenser, such as the condenser side of the boiler, wherein the vapor will, upon condensing, give up at least enough thermal energy to vaporize the feed liquid. The work added to the turbine can be added by directly mixing the compressed vapor, under substantially isobaric conditions, with a volume of hot gas, e.g., combustion gas, or by directly driving the turbine, e.g. with an externally powered engine, by a combination of direct mixing and direct driving, or by other means well known in the art. According to this method, maximum utilization is made of available thermal energies with the result that more efficient and economical high volume purification can be accomplished than with any other method heretofore known. Moreover, the system of the present invention, because its operation is independent of the method of evaporation, e.g., vacuum or flash distillation are both suitable, is extremely flexible in terms of its utility, and physical location. In the most common usage, where the impure liquid is impure water, the system is able to furnish large quantities of useful thermal energy, in the form of steam, in addition to large quantities of purified water.

The invention will be better understood from the following description considered together with the accompanying drawings, wherein like numerals designate like components, in which:

FIG. 15 illustrates schematically a single stage embodiment of the present invention wherein the turbine by pass is eliminated.

The invention will be better understood and appreciated from a consideration of a preferred embodiment thereof which, for purposes of a descriptive clarity, includes only a single-effect evaporative unit. It is of course appreciated, as is well known in the art, that multi-effect evaporative systems have many efficiencies which recommend them in practical usage. The present invention, as will be seen from the description of additional embodiments, contemplates the use of multi-as well as single-effect evaporative units. In addition, the invention contemplates both vacuum and flash evaporation as well as any other known evaporative techniques for producing high volumes of vapor at $P_1$, $T_1$, as will more clearly appear hereinafter. It is, however, preferred to use vacuum evaporation or vacuum distillation in most instances due to the greater flexibility it affords in terms of plant location.

Figure 1:
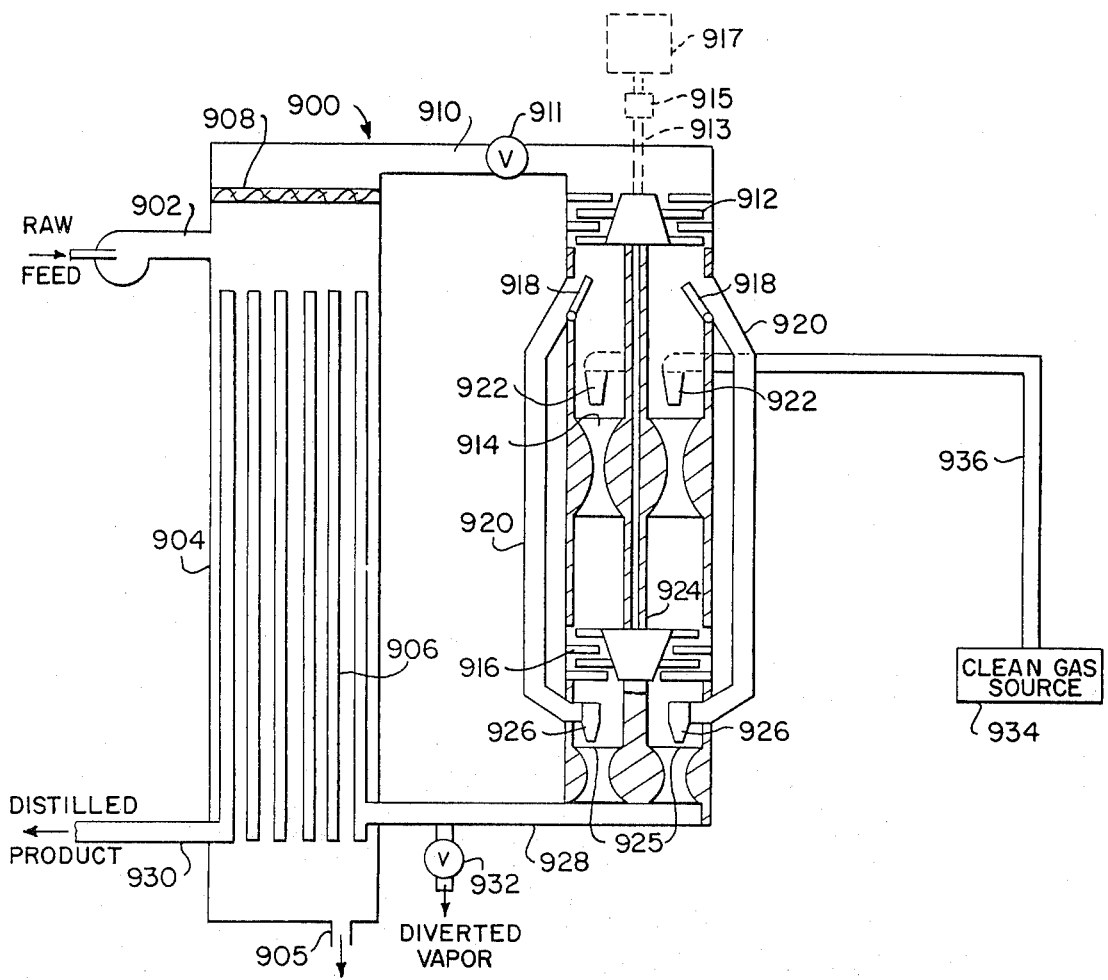
FIG. 1 illustrates schematically a single stage embodiment of the purification system of the present invention showing an exemplary means and an alternative means (in phantom) for adding work to the turbine.

Referring now to FIG. 1, a vacuum distillation-vapor compression system is shown generally at 900. The system consists in its essential aspects of a boiler unit 904 including a condenser section 906 therein, a variable compression ratio turbine compressor 912 operated through shaft 924 by turbine motor 916, turbine bypass arms 920, a mixing chamber 925 downstream of the turbine motor 916, and means for supplying additional or make-up work to turbine 916, i.e. work not done on the turbine by the vapors passing therethrough. The work supplying means may be hot clean gas supplying means 934 for supplying hot gases, e.g. combustion gases, to mixing chamber 914 for direct combination with the compressed vapors from compressor 912 to motivate turbine 916. Alternatively, in lieu of hot clean gases, or in addition thereto, the turbine 916 can be directly driven through its shaft 924 by motor means 917, such as an electric or diesel powered motor, acting through shaft 913 and clutch and gear box 915 (shown in phantom). It will be appreciated, therefore, that the language "adding make-up work to the turbine" or similar expressions used herein are intended to contemplate any addition of work to the system, whether directly or indirectly to the turbine, where the effect of that work is to motivate the turbine.

To understand the operation of the system 900, the path of raw feed, e.g., impure water, therethrough can be charted. Initially, a starter motor, such as motor 917, is energized to rotate shafts 913 and 924 through clutch and gear box 915. Compressor 912 and turbine 916, which are linked to shaft 924, also rotate when the motor 917 is operated. During start-up, the compressor 912 is allowed to rotate for a time sufficient for a vacuum to be drawn on the evaporative side of boiler 904. The extent of the vacuum is predetermined, as will be seen hereinafter, based upon the desired operating parameters of the system and the temperature of the influent impure water and is controlled and monitored by variable pressure valve 911 in duct 910 joining the boiler 904 and compressor 912. Optional means 934 for supplying hot gases to mixing chamber 914, if present, may be operated to motivate turbine 916 to keep it running during start-up and to heat the tubes 906 in the condenser section.

In this embodiment, a source 934 for clean hot gases is shown for supplying work to turbine 916 through duct 936 and may comprise a gas turbine system, described in connection with FIG. 1A, or any other known way of providing high temperature, high pressure gases, e.g., burning garbage at high temperature to produce high temperature, high pressure steam, may be used. Alternatively, the clean gas source 934 and mixing chamber 914 can be entirely dispensed with and a motor, such as motor 917, used to provide the additional work to turbine 916 through shafts 913 and 924. If desired, both direct mixing with hot gases and direct mechanical drive can be used together, or any other suitable method employed for adding necessary work to the turbine.

Referring to FIG. 1, which is described using direct gas mixing as the means for adding make-up work to turbine 916, it can be seen that the impure liquid feed enters system 900 through feed duct 902 and is rapidly heated to the boiling temperature, which depends on the vacuum level in the boiler 904, by heat transferred from the vapor condensing in hot condenser tubes 906. Unvaporized concentrated feed liquid, containing a large proportion of impurities therein, is removed from the boiler 904 through line 905. The vapor produced by boiling at $P_1$, $T_1$ is drawn through moisture separator 908 and into duct 910 leading to turbine compressor 912. The pressure $P_1$ is maintained in boiler 904 at a level not exceeding a pressure corresponding to $T_1$ under saturated conditions by pressure regulating valve 911 disposed in duct 910. The vapor is substantially adiabatically compressed at a ratio of from 1.1:1 to 200:1, preferably 5:1 to 100:1 and more preferably 5:1 to 50:1, in compressor 912 to $P_2$, $T_2$ and, upon leaving compressor 912, can proceed either through mixing chamber 914 and turbine motor 916 or can be diverted by by-pass control valves 918 into by-pass arms 920. Although two by-pass arms 920 are shown for descriptive convenience, there may, in fact, be only one by-pass arm or there may be multiple by-pass arms. Moreover, the vapor which flows into the by-pass arms may be at the same or at a higher pressure than the vapor which proceeds through turbine motor 916. Inasmuch as turbine compressors are frequently multi-stage units, and since the extent of compression depends on the number of stages through which the vapor passes, it is a simple matter to direct the flow into the by-pass arms 920 from a different compression stage than the flow which proceeds through turbine 916.

In accordance with this embodiment, it is contemplated that as little as a fraction of 1% or as much as a fraction less than 100% of the vapor flow exiting compressor 912, e.g., 0.01–99.9% by weight, preferably 0.15–95%, may be diverted into by-pass arms 920. Although it is unlikely that in practical operation the amount of vapor by-passing turbine 916 will be at either extreme, as will appear more clearly from the description which follows, the system 900 is operative at the extremes as well as at any point therebetween. The selection of the amount of flow to be diverted depends upon the economics sought from the process, the volume flow rate required and whether reduced operating expenditures take precedence over capital equipment expenditures, or vice-versa.

Assuming that direct mixing with hot gases is the method chosen to add work to the system upstream of or at turbine 916, the vapor which proceeds through compressor 912 is substantially isobarically admixed in mixing chamber 914 with hot, clean gases supplied from source 934 through duct 936 and emitted from injectors 922. The mixing chamber 914 may be a mixing injector, mixing aspirator, jet mixer or any other configuration known to be suitable for mixing vapors having different pressures in such a manner that a partial vacuum is created upstream of the actual mixing point. The partial vacuum is useful for drawing the non-injected vapor into the mixing chamber and thereby enhancing the mixing. The mixture of vapor and gases operate turbine motor 916 which is linked by shaft 924 to compressor 912. The temperature of the added gas is sufficiently greater than the temperature of the vapor to heat the vapor, at substantially constant pressure (i.e., $P_3=P_2$), by at least about 2° K. to $T_3$ before the vapor does work $W_2$ on turbine 916. Because of the direct shaft link between turbine 916 and compressor 912, the work $W_2$ done on the turbine equals the work $W_1$ done by the compressor on the vapor in substantially adiabatically compressing it. The vapor substantially adiabatically expands through turbine 916 with a resultant pressure and temperature drop to $P_4$, $T_4$.

The vapor which is diverted through by-pass arms 920 is at a temperature and pressure which equals $T_2$, $P_2$ in the case where all vapor is equally compressed in compressor 912. The by-pass vapor is recombined with the vapor passing through the turbine in injector or mixing section 925 wherein the bypass vapor is injected through injectors 926 into and, as shown in FIG. 1, in substantially the same direction as the stream of vapor exhausting the turbine. Mixing section 925 can have any suitable configuration for efficient mixing of vapors. The effect of this vapor mixing is to compress and heat the vapor exiting turbine 916 to ambient pressure, since the system downstream of turbine 916 is open to the ambient, and to $T_5$, whereupon the mixed vapor proceeds through vapor return duct 928 to condenser tubes 906 in boiler 904. The heat transfer temperature differential between the returning vapor at $T_5$ and the feed water at $T_1$ must be high enough that large volumes of feed water can be accomodated in this system within the practical limits imposed by reasonable condenser size. The vapor condenses in tubes 906 giving up its heat of vaporization to the feed liquid entering the system through feed duct 902. Purified condensate may be removed from the system for general usage through line 930. Excess steam may be diverted through line 932 to keep the system in thermal balance to heat the raw feed, to be injected into boiler 904, as will appear from a discussion of FIG. 2, or for other purposes.

It will appreciated that bypassing the turbine with at least a portion of the vapor together with the mixing action created by injectors 922 upstream of the turbine and injectors 926 downstream of the turbine have the net effect of creating a vacuum at the turbine outlet which materially eases the task of maintaining turbine rotation at a level sufficient that compressor 912 is able to perform a quantity of work $W_1$ in compressing the vapor. Nevertheless, a quantity of work $W_2 = W_1$ must still be done on turbine 916 by the vapor passing therethrough. Since the quantity of vapor passing through the turbine is decreased to the extent of the bypass, not as much vapor is available to run the turbine and the energy content of the bypass vapor must be compensated for, as, for example, by the addition of thermal energy via the gases, which may be combustion gases, injected into mixing chamber 914 through injectors 922. The hot gases as well as the additional thermal energy may be furnished in any form, as long as the gases are clean, from any available source. Suitable sources may include hot combustion gas sources, high temperature, high pressure steam sources, and the like. It will be appreciated, however, as previously indicated, that hot gas mixing to raise the thermal energy of the vapor and thereby permit the vapor to do the quantity of work $W_2$ on the turbine is not the only means of adding make-up work. Instead, the hot gas source 934, duct 936, injectors 922 and mixing chamber 914 can all be eliminated and the quantity of make-up work needed to reach $W_2$ which is not supplied by the vapor can be furnished by directly driving the turbine through mechanical means, such as motor 917.

Where, however, hot gases are added to the vapor to raise its thermal energy, it is preferred that direct mixing of gases occur in the space between the first compressor 912 and turbine 916. Alternative vapor heating configurations, such as by heat exchange through a conventional heat exchanger as taught in U.S. Pat. No. 3,423,293-Holden, is wasteful of thermal energy due to transfer inefficiencies and the resulting need for higher temperature heat transfer mediums, and is therefore uneconomical. Improved vapor and combustion gas mixing and more uniform temperature distribution along mixing chamber 922 can be achieved by use of multiple nozzle injectors (not shown) in chamber 922.

The system illustrated in FIG. 1 and the embodiments to be described hereinafter are useful even when the impure liquid feed contains dissolved salts which can precipitate and form scale on the outside of the condenser tubes and on the boiler wells at relatively high evaporation temperatures. Because scale deposits interfere with efficient heat transfer between the condensing vapor in the tubes and the feed liquid in the boiler, it is undesirable to operate the system at a boiler temperature at which scaling occurs. Therefore, when sea water containing calcium sulfate, magnesium hydroxide, calcium carbonate, and the like, is the liquid feed, since these salts are more soluble in cold sea water than in sea water above about 160° F., at temperatures above 160° F. scale will rapidly form on the hot tubes and condenser surfaces and will, in a short time, render the system operative only at very low thermal efficiencies. Therefore, if sea water is the liquid feed, boiler temperature ($T_1$) should be kept below 160° F. and preferably below 150° F. The system can still treat very large volumes of liquid feed in an efficient manner by maintaining a vacuum in the boiler at a level such that the boiling of the liquid feed is accomplished within the no-scaling temperature limitations.

The lower limit of $T_1$ is dictated by practical considerations since the system is unsuited for treating solid feed. Therefore, for water feeds $T_1$ should never be below the freezing point of water at ambient conditions, which at 1 atm. is 0° C. (32° F.) corresponding to a $P_1$ under substantially saturated conditions of 0.006 atm. $T_1$ is suitably at 33° F. or above. $T_1$ may be almost as high as the boiling point of water at 1 atm., which is 212° F., e.g., at about 211° F. and 0.99 atm. For non-aqueous systems, which at 1 atm. boil above or below the boiling point of water, the operable temperature limits of this system remain from just above the freezing point to just below the boiling point. This is so even for so-called high boiling organic substances, which boil above 212° F. At the reduced pressure in the evaporator, even these type liquids boil at significantly lower temperatures and can be practically employed.

Under preferred circumstances highest volumes in gallonage are obtained when vapor is evaporated under saturated conditions at a vapor pressure less than one atmosphere. As a general matter the lower the evaporation temperature, with the system in thermal balance, the higher the throughput volume and the higher the costs. Thus a water system utilizing an evaporator temperature of 170° to 211° F. produces an appreciable flow at relatively low cost. However, each system must be operated at evaporator temperatures and pressures, compression ratios, and the like, to meet the particular flow rate and cost requirements of each user. Therefore, depending upon whether a user desires to reduce operating costs at the expense of capital costs, or vice versa, one or more systems can be operated together to yield the desired flow rate and cost. The examples and data provided hereinafter are useful in making a choice of system parameter starting points necessary to meet a potential users needs.

Figure 1A:
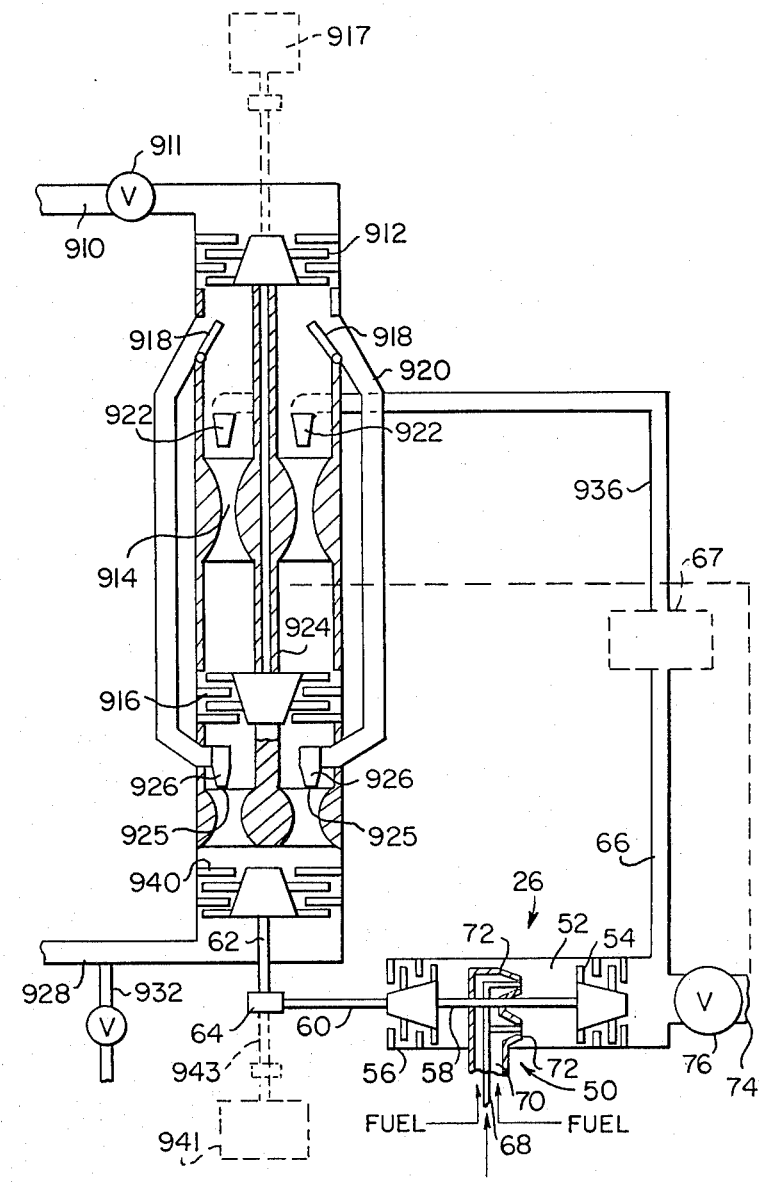
FIG. 1A illustrates schematically another single stage embodiment of the present invention including an independent compressor and exemplary and alternative (in phantom) means for operating the independent compressor.

FIG. 1A illustrates another embodiment of the present invention which differs from the FIG. 1 embodiment in the use of an independent second compressor 940 downstream of mixing section 925 and in the details of a motive power system 50 for furnishing hot, clean gases to injectors 922 and for driving the independent compressor 940. In the system of FIG. 1A, the $T_5$, $P_5$ vapor from mixing section 925 may be further compressed in a substantially adiabatic fashion to achieve the desired temperature differential for effective heat transfer in the condenser tubes 906 from the condensing vapor to the feed water entering duct 902. Thus, one important purpose for including an independent compressor is to provide great flexibility in operation at a relatively nominal cost, particularly where a motive system such as system 50 is operating to produce hot combustion gases for injection into mixing chamber 914. This flexibility is important to compensate for thermal imbalances which may occur in the system. Furthermore, steam injector load requirements may also be a factor that will make use of the independent compressor desirable, especially at low values of by-pass and/or low $P_2$ pressure values, if difficulty is encountered in achieving the flow rates shown in the Tables and Examples. The cost per 1000 gallons when an independent compressor is used is higher than the cost values set forth in the tables and examples. This higher cost, Cos- $t_{IC}$, may be calculated by using the following relationship:

$$\text{Cost}_{IC} = (2 - 0.01 BP) \times (\text{Cost from Tables})$$

For example, using the first entry from Table I where $T_1 = 207°$ F., BP = 12.7 and cost from the table = $0.15/1000 gal., the $\text{Cost}_{IC}$ is:

$$\text{Cost}_{IC} = (2 - 0.01 \times 12.7) \times \$0.15$$

$$\text{Cost}_{IC} = \$0.28/1000 \text{ gal.}$$

Motive system 50, which may be a gas turbine engine, includes, a combustion chamber 52 wherein hot combustion gases are produced, a turbine motor 54 operated by the hot combustion gases, and the compressor 56 linked to turbine 54 through shaft 58, shafts 60 and 62 linking compressor 56 through clutch and gear box 64 to independent compressor 940, and duct 66 for carrying the hot combustion gases to mixing chamber 914 through duct 936. Combustion chamber 52 is supplied by a compressed air duct 68 and a fuel duct 70 through air and fuel injectors 72. The fuel to air ratio is maintained for complete combustion of all fuel. Preferably, the burning fuel is supplied with an excess of air through duct 68, which may use as its source a small compressor or super charger (not shown) operated from shafts 58 or 60, so that the fuel burns to completion producing only carbon dioxide and steam as clean combustion products. The clean combustion gases together with the air drawn through compressor 56 operate turbine 54 and the combustion gas and air exhausting from the turbine exits by duct 74, controlled by servo-operated valve 76 which monitors the temperature in the space downstream of mixing chamber 914, and duct 66, which supplies clean combustion gases to the mixing chamber 914 through gas injectors 922. When the temperature downstream of the gas injectors 922 becomes too high, valve 76 opens to divert some of the combustion gas away from the mixing chamber 914 until the temperature stabilizes to the desired level. An optional combustion gas cleaning unit 67, shown in phantom, may be interposed along duct 66 to clean the gases in the event that combustion is incomplete or impurities enter the system with the fuel or air. Suitable gas cleaning units are well known and include, for examples scrubbers, electrostatic precipitators, chemical precipitators, and the like.

The independent compressor 940 need not, of course, be operated by a motive power system 50 as shown. Instead, the compressor could be operated directly by motor means 941 (shown in phantom), such as electrical, gasoline or diesel motors. In such a case, if direct mixing of hot gases is to be used to supply the make-up work to turbine 916, injector feed gas duct 936 could be connected to an alternative supply source for clean, hot gas, such as a pre-existing combustion gas source if system 900 were physically located near an industrial clean waste gas course, a separate fuel and air combustion gas generating source such as the combustion chamber, fuel and air supply ducts and injectors shown in this Figure, or, a steam production means with thermal energy supplied by burning inexpensive fuel, such as garbage, or by other suitable means. Alternatively, the use of hot gases to provide additional energy or work to the turbine can be entirely dispensed with and motor means 917 (shown in phantom) or any other terminal, electrical or mechanical energy source used to furnish the make-up work to turbine 916.

Figure 1B:
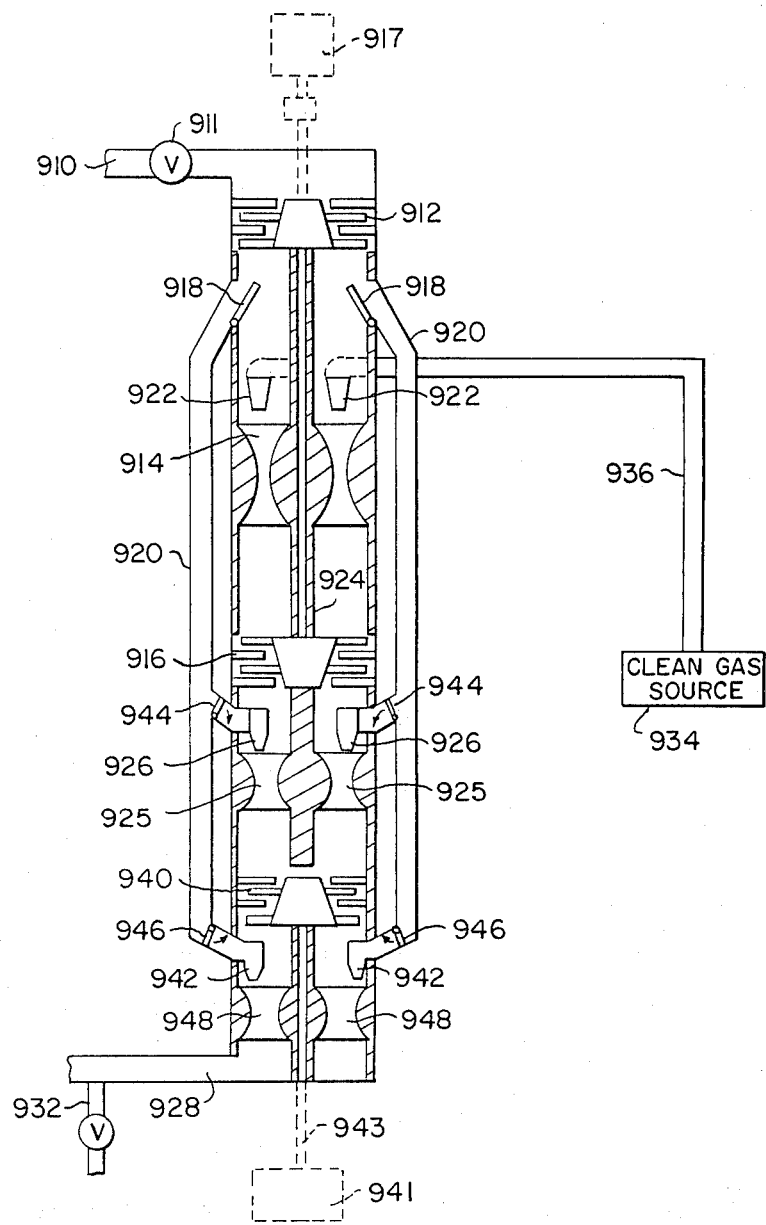
FIG. 1B illustrates a variation of the FIG. 1A embodiment.

FIG. 1B illustrates still another embodiment of the present invention wherein the system of FIG. 1A is modified by adding thereto a third mixing section 948, similar to mixing sections 914 and 925, wherein vapor flowing in bypass arms 920 may be injected downstream of independent compressor 940 through injectors 942. Such an arrangement provides a large degree of operational flexibility and permits continuous operation even under adverse conditions. Whether vapor flowing in bypass arms 920 is admixed with vapor expanding through turbine 916 in mixing chamber 925 through injectors 926 or with higher pressure and temperature vapor downstream of independent compressor in mixing chamber 948 through injectors 942 is controlled by bypass flow control valves 944 and 946, respectively. As in the embodiments of FIGS. 1 and 1A, the additional energy needed to drive turbine 916 may be furnished from clean gas source 934 as thermal energy, from motor means 917 as mechanical energy, or from any other suitable source. In a similar manner, independent compressor 940 may be directly driven through motor means 941 or may be driven in any other suitable way.

Figure 2:
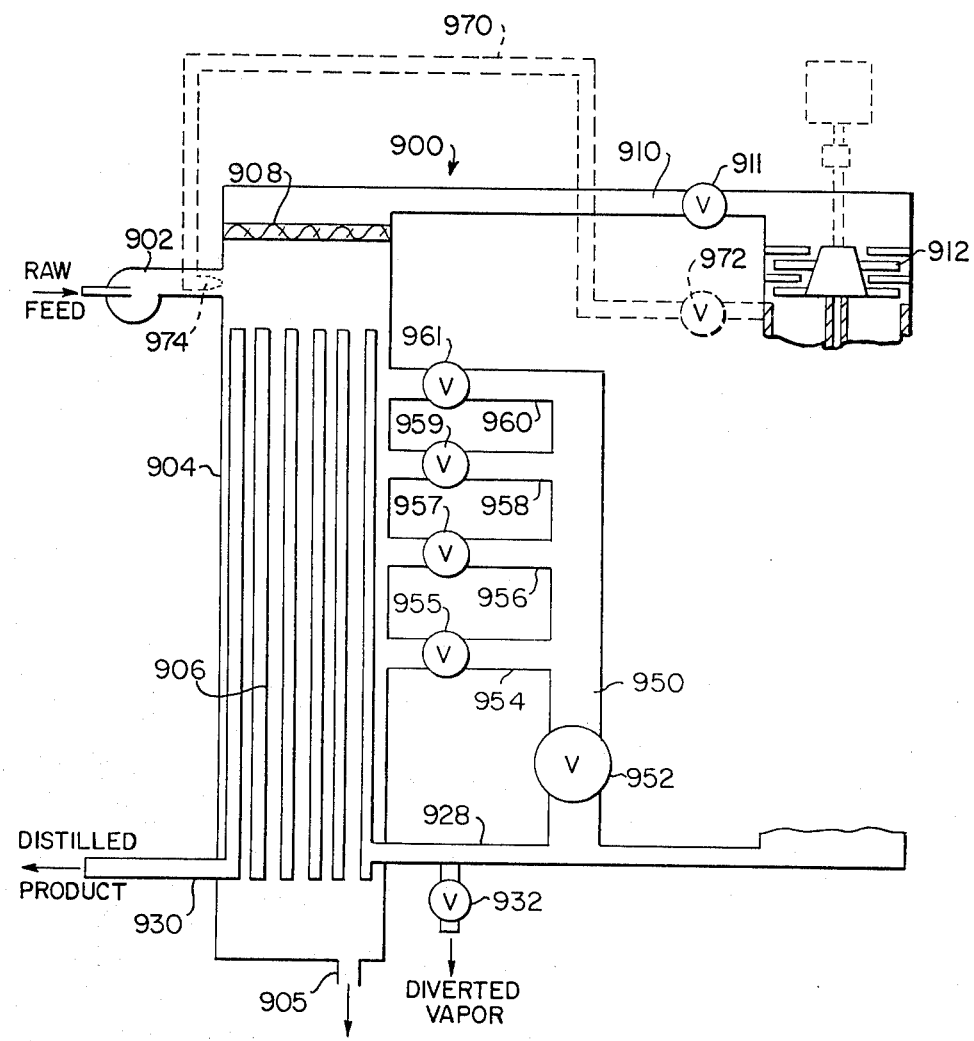
FIG. 2 illustrates schematically the single stage embodiment of FIG. 1, with the vapor treatment section deleted, including means for diverting a portion of the effluent vapor for direct mixing with the raw feed liquid.

FIG. 2 illustrates a modification to the present invention which is equally applicable to all embodiments of the present invention, indeed to all vacuum and flash distillation systems, whether or not an independent compressor is used, whether or not bypass arms are used (see FIG. 15) and whether the make-up work is obtained from direct mixing of hot gases or direct driving of the turbine. In accordance with this modification, a fraction of the compressed vapor returning to the condenser tubes 906 through duct 928 is diverted and directly injected into the boiler 904 where it mixes with the impure feed water therein, giving up its latent heat of vaporization and raising the temperature of the feed water in the boiler to $T_1$. This is particularly useful and important where the raw feed entering duct 902 is relatively cold, e.g., water at about 33°–70° F. If the temperature in boiler 904 is maintained at such a low temperature, it is necessary for $P_1$ to also be low for boiling to occur at $T_1$. However, it is very expensive to draw and maintain a high vacuum in the boiler and, rather than do so, it may be desirable to raise the raw feed temperature to a value at which the system may be more economically operated. The expense of raising the raw feed temperature to $T_1$ by diverting a fraction of the returning vapor and direct mixing it with the feed water is readily measured since whatever flow is diverted does not exit the system as purified liquid through line 930. On the other hand, direct mixing in the boiler is a far more efficient means of heating the raw feed then, for example, by diverting the returning vapor through an external heat exchanger in which it can heat raw feed or by passing all the returning vapor through condenser tubes 906, as in the other embodiments of this invention.

In FIG. 2, the details of the vapor treatment section of the system are not shown since this modification is equally applicable to all embodiments described herein. Compressed vapor exiting the independent compressor or leaving the final mixing chamber depending upon the embodiment used, is directed to the condenser tubes 906 through return duct 928. This compressed vapor is at a temperature, $T_f$, and has an enthalpy, $h_f$. A portion of the vapor is diverted through duct 950 and its associated valve 952 into ducts 954,956,958 and 960 and their respective valves 955,957,959 and 961 for injection back into boiler 904. Although four injection ducts are shown, it will be appreciated that any number of such ducts may, in practice, be used. The remaining or undiverted vapor continues through duct 928 into condenser tubes 906 and exits the system as purified effluent through line 930. The fraction of the vapor which must be diverted to heat the raw feed can be calculated by assuming that the temperature of the impure raw feed liquid in feed duct 902 is $T_o$ and its enthalpy is $h_o$. The enthalpy change required, per pound of raw feed, to heat from $T_o$ to $T_1$ is $(h_l - h_o)$. In order to produce this change, a fraction, $F_D$, of returning vapor, e.g., steam, a $h_f$ must be diverted through duct 950 and admixed with the feed liquid, condensing in the process and having a final temperature of $T_1$. For one pound of returning vapor, the enthalpy change is $h_f - h_l$ and the fractional change is $F_D (h_f - h_l)$. Since the enthalpy change in the condensing vapor must equal the enthalpy change of the raw feed, it can be determined that:

$$F_D = h_l - h_o / h_f - h_o$$

From this relationship the fraction of compressed vapor diverted from duct 928 into duct 950 can be determined for various raw feed temperatures and desired boiler temperatures. By similar well known techniques the flow rate of effluent, $R_D$, which continues on through the condenser tubes and exits line 930 can be readily calculated.

An optional aspect of the system shown in FIG. 2 involves the use of return line 970 and associated valve 972 (shown in phantom) to divert a small portion of the flow exiting compressor 912 (16 in FIG. 15) back to raw feed duct 902 wherein it is injected through injector 974 (shown in phantom). In this way, the vapor injected through injector 974 will create a pumping effect in duct 902 to aid the feed of liquid therethrough while, at the same time, heating the incoming feed liquid. Line 970 is optional, although useful, because its contribution to the heating of the raw feed is small compared to the vapors injected directly into boiler 904 through ducts 954,956,958 and 960 and because the vacuum drawn by compressor 912 is generally adequate to draw the raw feed into the boiler.

With the foregoing general description of the operation of a few embodiments of a single stage vacuum distillation-vapor compression system serving to set forth the fundamentals of the present invention, before other embodiments and variations are described, it will be useful to consider the following more specific examples of the operation of the instant system. Accordingly, the following illustrative examples are offered by way of further explanation and are not intended to expressly or impliedly limit the scope of the invention.

EXAMPLE I

This Example, employing the embodiment of FIG. 1, utilizes impure water as the feed liquid and assumes an initial boiler temperature $T_1$ of 122° F. or 582° R. from which the initial vapor pressure in the boiler $P_1$ can be determined from standard charts to be 1.789 psia. The enthalpy of the saturated vapor under these conditions is given by standard tables to be $h_l = 1114$ BTU/lb. The chosen compression ratio for variable compression ratio compressor 912 is 15:1, i.e., $P_2/P_1 = 15/1$.

From the ideal gas law applied to adiabatic compressions and expansions and assuming that the heat capacities at constant volume and pressure, $C_v$ and $C_p$, are constant, it is known that:

$$T_2/T_1 = (P_2/P_1)^b$$

where $b = \gamma - 1/\gamma$ and $\gamma = C_p/C_v$. Adopting the physical constants for water disclosed in U.S. Pat. No. 3,243,293 - Holden, $b = 0.2445$, and substituting $P_2 = 15 P_1$ and $T_1 = 582°$ R. into equation (1):

$$T_2 = 582 (15)^{0.2445} = 1128° \text{ R.} (668° \text{ F.})$$

Inasmuch as $P_2 = 15 P_1$; $P_2 = 26.836$ psia. From the saturated steam tables it can be seen that at $T_2 = 668°$ F., the saturation pressure is 2498.1 psia. Since the actual pressure, $P_2$, is only 26.836 psia it will be appreciated that the steam is unsaturated. The enthalpy of unsaturated steam at $T_2 = 668°$ F., $P_2 = 26.836$ psia can be determined by interpolation in standard water and steam tables to be $h_2 = 1368$ BTU/lb.

The demand work, $W_D = W_1$, or work done by compressor 912 on the vapor, is defined by the relationship:

$$W_D = W_1 = h_2 - h_1$$

where $h_1$ is the enthalpy of the uncompressed vapor at $T_1 = 122°$ F., $P_1 = 1.789$ psia. Substituting the known values of $h_2$ and $h_1$ yields $$W_D = W_1 = 254 \text{ BTU/lb.}$$

Upon exiting compressor 912, a portion of the compressed vapor at $P_2$ proceeds through bypass arms 920. This percent bypass (BP) or fractional bypass (0.01BP) does not expand through turbine 916. Rather, it expands in a substantially adiabatic manner through injector nozzle 926 from $P_2$ to $P_{BP}$. However, since the system downstream of turbine 916 is effectively open to ambient, $P_{BP} = 1$ atm, and the resulting temperature, $T_{BP}$ of the vapor exiting injectors 926 is given by the adiabatic formula for ideal gases as:

$$T_{BP} = T_2 (P_{BP}/P_2)^{0.2445}$$

Since $P_{BP} = 1$ atm., $P_2 = 15 P_1$ and $T_2 = T_1 (15)^{0.2445}$, $T_{BP}$ becomes:

$$T_{BP} = T_1 (1/P_1)^{0.2445}$$

At the same time the fraction of the compressed vapor which does not bypass the turbine expands through the turbine to $T_4$, $P_4$. It can reasonably be assumed, in view of the direct shaft link between compressor 912 and turbine 916, that the expansion in the turbine will not exceed the compression in the compressor and, therefore, that the limiting value of $P_4$ is $P_1$ and of $T_4$ is $T_1$. Taking the system at its limit, the vapor exhausting turbine 916 is at $T_4 = T_1$, $P_4 = P_1$. This vapor is compressed in a substantially adiabatic fashion in the venturis in mixing section 925 to $T_R$, $P_R$. Since $P_R = 1$ atm., $T_R$ can be calculated as follows:

$$T_R = T_4 (1/P_4)^{0.2445}$$

Substituting $T_4 = T_1$ and $P_4 = P_1$, $$T_R = T_1 (1/P_1)^{0.2445}$$

Thus, $T_R = T_{BP}$ and, irrespective of the value of BP, the temperature, $T_5$, of the mixed vapor downstream of mixing section 925 is $T_5 = T_R = T_{BP}$. For $T_1 = 582°$ R. and $P_1 = 1.789$ psia, $T_5 = 514°$ F.

The enthalpy of the combined vapor stream at $T_5$, $P_5$ is denoted $h_5$ and may be used to determine the bypass percentage, BP, for any $P_1$, $T_1$ and compression ratio. Realizing that the enthalpy released by bypass vapors extending through injectors 926 equals the enthalpy gained by the turbine throughput vapors compressing in the mixing section venturis, and specifying the enthalpy released as $0.01BP (h_2 - h_5)$ and the enthalpy gained as $(1 - 0.1BP)(h_5 - h_1)$, and equating the enthalpy released to the enthalpy gained:

$$BP = 100 (h_5 - h_1)/h_2 - h_1.$$

Substituting the known values for $h_1$ and $h_2$ and determining $h_5 = 1295$ BTU/lb from standard tables, $BP = 71.3\%$

EXAMPLE II

In systems such as the one exemplified in Example I, it has been determined that the temperature of the vapor in the condenser, $T_5$, exceeds the saturation temperature for $P_5 = 1$ atm. of 212° F. This means that the heat released by the vapor in condensing, $Q_c$, is greater than the heat of vaporization, $Q_v$, with the result that some fraction of the vapor, $F_u$, is uncondensed. This fraction depends upon the quantity of surplus heat, $Q_s$, released beyond the heat of vaporization, or $$Q_s = Q_c - Q_v.$$

Since $Q_c$ is the amount of heat released by the vapor at $T_5$ and 1 atm. condensing and cooling to $T_1$(liquid), $$Q_c = h_5 - h_1(\text{liq}).$$

and $Q_v$ is the heat given up by the vapor at $T_1$ condensing to a liquid at $T_1$, $$Q_v = h_1 - h_1(\text{liq}).$$

Substituting for $Q_c$ and $Q_v$, $Q_s = h_5 - h_1$, and the fraction uncondensed, $F_u = Q_s/Q_v$, becomes:

$$Q_s/Q_v = F_u = h_5 - h_1 h_1 - h_1(\text{liq})$$

Using the known values for $h_1$ and $h_5$ and finding $h_1$ (liq) in the steam tables to be $h_1(\text{liq}) = 90$ BTU/lb, the values of $Q_s$, $Q_c$, $Q_v$ and $F_u$ can be calculated to be:
$Q_c = 1205$ BTU/lb.
$Q_v = 1024$ BTU/lb.
$Q_s = 181$ BUT/lb.
$F_u = 0.177$ If a diverter line 932 (shown including a valve in FIG. 1) is junctioned into vapor return line 928 to permit the quantity of vapor passing into the condenser tubes 906 to be controlled so that only the amount necessary to vaporize the raw feed at $T_1$, reaches the condenser, the remainder can be diverted to other uses. As a result, instead of only condensate alone being produced in the system, both condensate and superheated steam becomes available from the system.

Both the condensate and steam have a number of uses, for example:
  (a) the condensate can be used for drinking water or for industrial purposes that require pure water;
  (b) the steam can be used for heating or for producing electrical power;
  (c) the condensate can be heated by the steam to any temperature up to the boiling point by indirect heat exchange;
  (d) the steam can be condensed at little cost, e.g., by using a finned radiator cooled by air blown over it where the blower is powered by the motive power system;
  (e) the steam can be diverted to duct 950 shown in FIG. 2 for direct injecting into the raw feed in boiler 904 to heat the raw feed.

EXAMPLE III

To demonstrate that the instant system can in fact purify large volumes of impure water using equipment, specifically a condenser, of reasonable size and availability, it is assumed herein that compressor 912 can maintain the boiler pressure $P_1$ at 1.789 psia by removing vapor therefrom as rapidly as it is produced. In this case, the rate of flow of vapor is solely dependent on the rate that the heat of vaporization is transferred to the feed liquid. The heat of vaporization of water boiling at 122° F. and 1.789 psia is $Q_v = 1024$ BTU/lb and the temperature difference between the condensing vapor and the feed liquid at $P_5 = 1$ atm. is $\Delta T_{LM}$. $\Delta T_{LM}$ is the log mean temperature difference during condensation which together with the initial temperature of the impure liquid, $T_1$, and the desired final distillate effluent temperature, $T_D$, determines the required condenser size.

$$\Delta T_{LM} = \Delta T_{max} - \Delta T_{min}/\ln (\Delta T_{max}/\alpha T_{min})$$

where $\Delta T_{max} = T_5 - T_1$, $\Delta T_{min} = T_D - T_1$, and $T_D$ is selected to be equal to or less than the vapor condensation temperature and greater than $T_1$.

The surface area A in square feet of a condenser required to condense R gallons/hr of condensate at 122° F. having a heat of vaporization $Q_v$ of 1024 BTU/lb through a temperature differential of 392° F. in a stainless steel condenser having a coefficient of heat transfer "h" of 250 BTU/hr—°F.—ft$^2$ can be determined from the following relationship:

$$A = RQ_v/h\Delta T_{LM}$$

Rewriting Equation 11 in terms of R:

$$R = Ah\Delta T_{LM}/Q_v$$

It is known that a conventional condenser unit, such as is manufactured by the Pfaudler Company of Rochester, New York, which is 5 feet long and 5 feet wide has an effective surface area for heat transfer of 2988 ft.$^2$. Therefore, the length L of such a unit necessary to provide A ft.$^2$ of surface area is denoted by the formula:

$$A/2988 \times 5 = L$$

$$A = 2988L/5$$

Inserting the aforementioned values for h, and A and assuming $L = 40'$ yields:

$$R = 5,976,000\Delta T_{LM}/Q_v$$

At $\Delta T_{LM}=199°$ F. and $Q_v=1024$ BTU/lb. a flow of about R=145,201 gallons/hr can be accomodated and condensed.

EXAMPLE IV

The cost to produce the flow R determined in Example III depends upon the make-up work, $W_{mu}$, which has to be done on the turbine. The makeup work is that fraction of the demand work, $W_D$, which is lost when vapor proceeds through the bypass arms 920 rather than through the turbine:

$$W_{mu}=0.01BP \times W_D$$

In the case illustrated in the foregoing Examples I–III, $0.01BP=0.713$ and $W_D=254$ BTU/lb. Substituting, we find that $W_{mu}=181.1$ BTU/lb.

This work, $W_{mu}$, is the work that must be added to the system by direct driving the compressor-turbine through motor means 917 or by addition of hot gases through injectors 922, or otherwise. The cost can be determined by assuming that the cost to produce energy is about \$2.70/1,000,000 BTU. Therefore, the cost/1,000 gallons to operate the present system is the cost of the make-up work. Expressing this in terms of percent bypass, we find:

$$\text{Cost}/1,000 \text{ gal}=2.16\times 10^{-4}(BP)(W_D)$$

This works out, when $BP=71.3\%$ and $W_D=254$ BTU/lb are substituted, to be:

$$\text{Cost}/1,000 \text{ gal}=\$3.90$$

This cost value is, of course, idealized and does not take into account system inefficiencies. Therefore, actual costs will be somewhat higher.

EXAMPLE V

The values calculated by the methods described in Examples I–IV have been determined for other initial temperatures ($T_1$) and other compression ratios in turbine compressor 912. Table I shows these values for water for a representative sampling of $T_1$ values at compression ratios of 2:1, 5:1, 15:1, 25:1, 50:1, 100:1 and 200:1, although it will be appreciated that the only limitation on compression ratio is the availability of equipment.

TABLE I

| T₁ (°F.) | P₁ (psia) | CR | T₂ (°F.) | P₂ (psia) | h₁ (BTU/lb) | h₂ (BTU/lb) | h₅ | h₁ (liq) | T₅ (°F.) | BP (%) | F_u | Q_c | Q_v (BTU/lb) | Q_s | W_D | ΔT_LM (°F.) | T_D (°F.) | R (gal/hr) | $/1000 gal. |
|---|---|---|---|---|---|---|---|---|---|---|---|---|---|---|---|---|---|---|---|
| 207 | 13.297 | 2 | 330 | 26.59 | 1149 | 1204 | 1156 | 175 | 224 | 12.7 | .007 | 981 | 974 | 7 | 55 | 8.98 | 211 | 6,891 | 0.15 |
| 210 | 14.123 | 5 | 533 | 70.62 | 1150 | 1299 | 1153 | 178 | 217 | 2.01 | .003 | 975 | 972 | 3 | 149 | 3.99 | 212 | 3,067 | 0.06 |
| 103 | 1.038 | 15 | 631 | 15.57 | 1106 | 1350 | 1344 | 71 | 618 | 97.5 | .230 | 1273 | 1035 | 238 | 244 | 255 | 205 | 184,091 | 5.16 |
| 122 | 1.789 | 15 | 668 | 26.83 | 1114 | 1368 | 1295 | 90 | 514 | 71.3 | .177 | 1205 | 1024 | 181 | 254 | 199 | 205 | 145,201 | 3.90 |
| 169 | 5.856 | 15 | 759 | 87.84 | 1134 | 1410 | 1206 | 137 | 328 | 26.1 | .072 | 1069 | 997 | 72 | 276 | 82.81 | 205 | 62,043 | 1.55 |
| 198 | 11.058 | 15 | 816 | 165.87 | 1145 | 1435 | 1166 | 166 | 245 | 7.24 | .021 | 1000 | 979 | 21 | 290 | 21.01 | 205 | 16,028 | 0.45 |
| 211 | 14.407 | 15 | 841 | 216.10 | 1150 | 1446 | 1151 | 179 | 214 | 0.34 | .001 | 972 | 971 | 1 | 296 | 1.82 | 212 | 1,400 | 0.02 |
| 90 | 0.698 | 25 | 748 | 17.45 | 1101 | 1407 | 1383 | 58 | 698 | 92.2 | .270 | 1325 | 1043 | 282 | 306 | 296.05 | 205 | 212,034 | 6.09 |
| 122 | 1.789 | 25 | 819 | 44.72 | 1114 | 1442 | 1295 | 90 | 514 | 55.2 | .177 | 1205 | 1024 | 181 | 328 | 199 | 205 | 145,201 | 2.90 |
| 149 | 3.627 | 25 | 878 | 90.68 | 1126 | 1470 | 1238 | 117 | 397 | 32.6 | .111 | 1121 | 1009 | 112 | 344 | 129.03 | 205 | 95,522 | 2.45 |
| 198 | 11.058 | 25 | 985 | 276.45 | 1145 | 1519 | 1166 | 166 | 245 | 5.61 | .021 | 1000 | 979 | 21 | 374 | 21.01 | 205 | 16,028 | 0.45 |
| 209 | 13.843 | 25 | 1009 | 346.05 | 1149 | 1530 | 1154 | 177 | 219 | 1.31 | .005 | 977 | 972 | 5 | 381 | 5.81 | 212 | 4,468 | 0.11 |
| 65 | 0.305 | 50 | 906 | 15.28 | 1090 | 1486 | 1480 | 33 | 893 | 98.5 | .368 | 1447 | 1057 | 390 | 396 | 387.1 | 205 | 273,562 | 8.42 |
| 80 | 0.507 | 50 | 945 | 25.34 | 1096 | 1506 | 1418 | 48 | 770 | 78.5 | .307 | 1370 | 1048 | 322 | 410 | 330.72 | 205 | 235,735 | 6.91 |
| 100 | 0.949 | 50 | 997 | 47.46 | 1105 | 1532 | 1354 | 68 | 639 | 58.3 | .240 | 1286 | 1037 | 249 | 427 | 265.32 | 205 | 191,123 | 5.35 |
| 149 | 3.627 | 50 | 1124 | 181.36 | 1126 | 1596 | 1238 | 117 | 397 | 23.8 | .111 | 1121 | 1009 | 112 | 470 | 129.03 | 205 | 95,522 | 2.44 |
| 179 | 7.346 | 50 | 1203 | 367.30 | 1138 | 1633 | 1191 | 147 | 297 | 10.7 | .053 | 1044 | 991 | 53 | 495 | 60.82 | 205 | 45,847 | 1.18 |
| 179 | 7.346 | 50 | 1203 | 367.30 | 1138 | 1633 | 1191 | 147 | 297 | 10.7 | .053 | 1044 | 991 | 53 | 495 | 39.29 | 186 | 29,620 | 1.18 |
| 198 | 11.508 | 50 | 1252 | 552.90 | 1145 | 1657 | 1166 | 166 | 245 | 4.10 | .021 | 1000 | 979 | 21 | 512 | 21.01 | 205 | 16,028 | 0.45 |
| 211 | 14.407 | 50 | 1286 | 720.35 | 1150 | 1673 | 1151 | 179 | 214 | 0.19 | .001 | 972 | 971 | 1 | 523 | 1.82 | 212 | 1,400 | 0.02 |
| 45 | 0.147 | 100 | 1096 | 14.75 | 1081 | 1584 | 1582 | 13 | 1095 | 99.6 | .470 | 1571 | 1068 | 503 | 503 | 473.06 | 205 | 330,876 | 10.82 |
| 45 | 0.147 | 100 | 1096 | 14.75 | 1081 | 1584 | 1582 | 13 | 1095 | 99.6 | .470 | 1571 | 1068 | 503 | 503 | 208.16 | 52 | 145,593 | 10.82 |
| 65 | 0.306 | 100 | 1158 | 30.55 | 1090 | 1617 | 1480 | 33 | 893 | 74.0 | .368 | 1447 | 1057 | 390 | 527 | 387.1 | 205 | 273,562 | 8.42 |
| 122 | 1.789 | 100 | 1334 | 178.89 | 1114 | 1709 | 1294 | 90 | 514 | 30.3 | .177 | 1205 | 1024 | 181 | 595 | 199 | 205 | 145,201 | 3.86 |
| 169 | 5.856 | 100 | 1479 | 585.62 | 1134 | 1784 | 1206 | 137 | 328 | 11.1 | .072 | 1069 | 997 | 72 | 650 | 82.8 | 205 | 62,043 | 1.54 |
| 188 | 8.947 | 100 | 1537 | 894.70 | 1141 | 1812 | 1179 | 156 | 272 | 5.7 | .039 | 1023 | 985 | 38 | 671 | 41.94 | 205 | 31,805 | 0.83 |
| 201 | 11.766 | 100 | 1577 | 1176.6 | 1146 | 1832 | 1162 | 169 | 238 | 2.5 | .017 | 994 | 977 | 17 | 686 | 18.02 | 208 | 13,776 | 0.35 |
| 33 | 0.092 | 200 | 1340 | 18.45 | 1076 | 1715 | 1662 | 1 | 1243 | 91.7 | .545 | 1661 | 1075 | 586 | 639 | 532.07 | 205 | 369,725 | 12.66 |
| 60 | 0.256 | 200 | 1439 | 51.24 | 1088 | 1769 | 1503 | 28 | 939 | 60.9 | .391 | 1475 | 1060 | 415 | 681 | 407.31 | 205 | 287,041 | 8.97 |
| 77 | 0.459 | 200 | 1500 | 91.85 | 1095 | 1802 | 1430 | 45 | 793 | 47.4 | .319 | 1385 | 1050 | 335 | 707 | 341.53 | 205 | 242,976 | 7.25 |

EXAMPLE VI

An impure liquid feed having an initial temperature of 198° F. was fed into the system of Example I using a compression ratio of 15:1, $P_1$ at $T_1=198°$ F. is 0.7524 atm. $P_2$, $T_2$ and $T_4$ can be calculated and $Q_v$, $h_5$, $h_1$ and $h_2$ determined as in Example I. From these values it is found, using the methods of Example II through IV, that:

$$R = 16.028 \text{ gal/hr}$$

$$\$Cost/1{,}000 \text{ gal} = \$0.45$$

In order to keep the cost constant, if the raw feed water is at $T_o = 70°$ F., it can be heated to $T_1 = 198°$ F. by diverting a fraction of the vapor at $T_f$, which is $T_5$ in Example I and mixing the diverted fraction with the raw feed water. This fraction, $F_D$, is determinable from the relationship:

$$F_D = h_{198}(\text{liq}) - h_{70}(\text{liq})/h_f - h_{70}(\text{liq})$$

to be, $F_D = 0.1135$.

It can be calculated that $F_u$, the fraction of vapor uncondensed, under these conditions is only 0.021. Therefore, there is no surplus vapor available and the amount of vapor diverted will decrease the vapor flow, R, produced by the system by the factor $(1 - F_D)$ to $R_D$.

$$R_D = R (1-0.1135)$$

$$R_D = 14{,}209 \text{ gal/hr}.$$

It can thus be seen that only a relatively small flow reduction must be suffered to provide the flexibility of handling raw feed at 70° F. for the same cost as raw feed at 198° F. From this type of analysis, a table can be constructed as set forth in Table II.

TABLE II

| Comp. Ratio | (°F.) $T_o$ | (°F.) $T_D$ | (°F.) $T_1$ | $F_D$ | gal/hr $R_{T1}$ | $R_D$ | $/1000 gal. |
|---|---|---|---|---|---|---|---|
| 2 | 70 | 211 | 207 | 0.1225 | 6,891 | 6,047 | 0.15 |
| 15 | 33 | 212 | 210 | 0.1536 | 3,067 | 2,596 | 0.06 |
| 15 | 33 | 205 | 179 | 0.1227 | 45,847 | 40,222 | 1.15 |
| 15 | 60 | 205 | 169 | 0.0925 | 62,043 | 56,304 | 1.55 |
| 15 | 70 | 205 | 198 | 0.1135 | 16,028 | 14,209 | 0.45 |
| 15 | 70 | 205 | 160 | 0.0824 | 76,745 | 70,421 | 1.94 |
| 15 | 100 | 205 | 188 | 0.0792 | 31,805 | 29,286 | 0.80 |
| 50 | 70 | 205 | 198 | 0.1335 | 16,028 | 14,209 | 0.45 |
| 100 | 70 | 211 | 207 | 0.1225 | 6,891 | 6,047 | 0.15 |
| 200 | 75 | 211 | 207 | 0.1186 | 6,891 | 6,047 | 0.15 |

Figure 3:
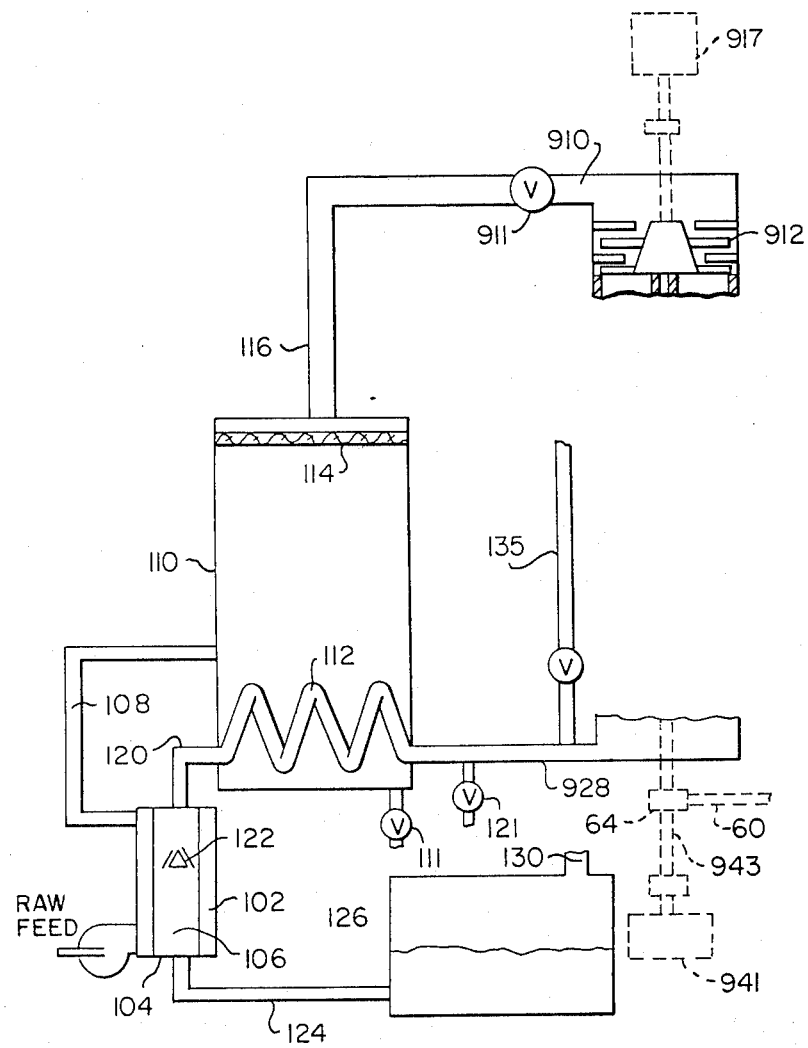
FIG. 3 illustrates schematically another single stage vaporization embodiment of the present invention.

Referring now to FIG. 3, the impure liquid feed enters the shell side 102 of the heat exchanger-condenser unit 104 where it is heated by passage of partially condensed vapor through the condenser side 106 of the unit. The heated feed in liquid form exits the shell side 102 via feed line 108 and enters vacuum distillation boiler 110 which is maintained at a selected vacuum $P_1$ controlled by pressure regulating valve 910 in line 911. The feed liquid is rapidly heated to boiling temperature $T_1$ by vapor passing through and condensing in the condenser section coil 112 in boiler 110. The vapors pass out of boiler 110 through moisture separator 114 via vapor line 116 and then via line 910 and valve 911 and pass into the vapor treatment section of the system (not shown). It will be appreciated that any of the vapor treatment section configurations shown in FIGS. 1, 1A, 1B or 15 may be employed in this embodiment of the invention. In the vapor treatment section, the vapors are substantially adiabatically compressed by compressor 912 to $P_2$, $T_2$ and then further treated in the manner described in connection with FIGS. 1, 1A, 1B and 15, depending upon the vapor treatment section configuration employed, before entering condenser section coils 112 via return line 928. It should be understood that hot combustion gases may be used to provide make-up work in the turbine and a motive system, such as system 50, may be used to drive the independent compressor when such a compressor is used. Alternatively, both the make-up work and the energy for driving the independent compressor can come from motor means, such as motors 917 and 941, or from other suitable energy sources. In the condenser section 112 the vapors condense at least partially, transferring their latent heat to the feed liquid entering the boiler 110 through feed line 108. The almost completely condensed vapor exits condenser section coils 112 via line 120 and passes into the condenser side 106 of unit 104. Controlling flow through the condenser side 106, which is preferably a jet condenser having pressure and expansion chambers therein, is servo or spring controlled pressure valve 122 which serves to maintain the pressure on condenser side 106 of unit 104 and to assure that all vapors condense therein. Excess steam may be diverted by line 121 so that the system remains in balance and too high a temperature does not develop in the feed water. Line 124 carries condensed vapor into storage container 126 from which pure condensate may be drawn for general usage through line 128. Non-condensible gases exit via vent 130. Concentrated waste liquid is removed from boiler 110 via line 111.

When hot gases are directed to the vapor treatment section through injectors 922, a portion of the vapor in return line 928 may be diverted via line 135 to duct 936 and then through injectors 922 to furnish an increased vapor flow to the turbine 916. If line 135 is utilized, the turbine 916 should preferably have waterways to take into account the possibility that in expanding the increased vapor through the turbine 916, a portion of the condensible vapor will in fact condense. The effect of diverting vapor flow through line 135 to turbine 916 is to increase the efficiency of the turbine by extracting as much work as possible from the vapor passing therethrough.

Figure 4:
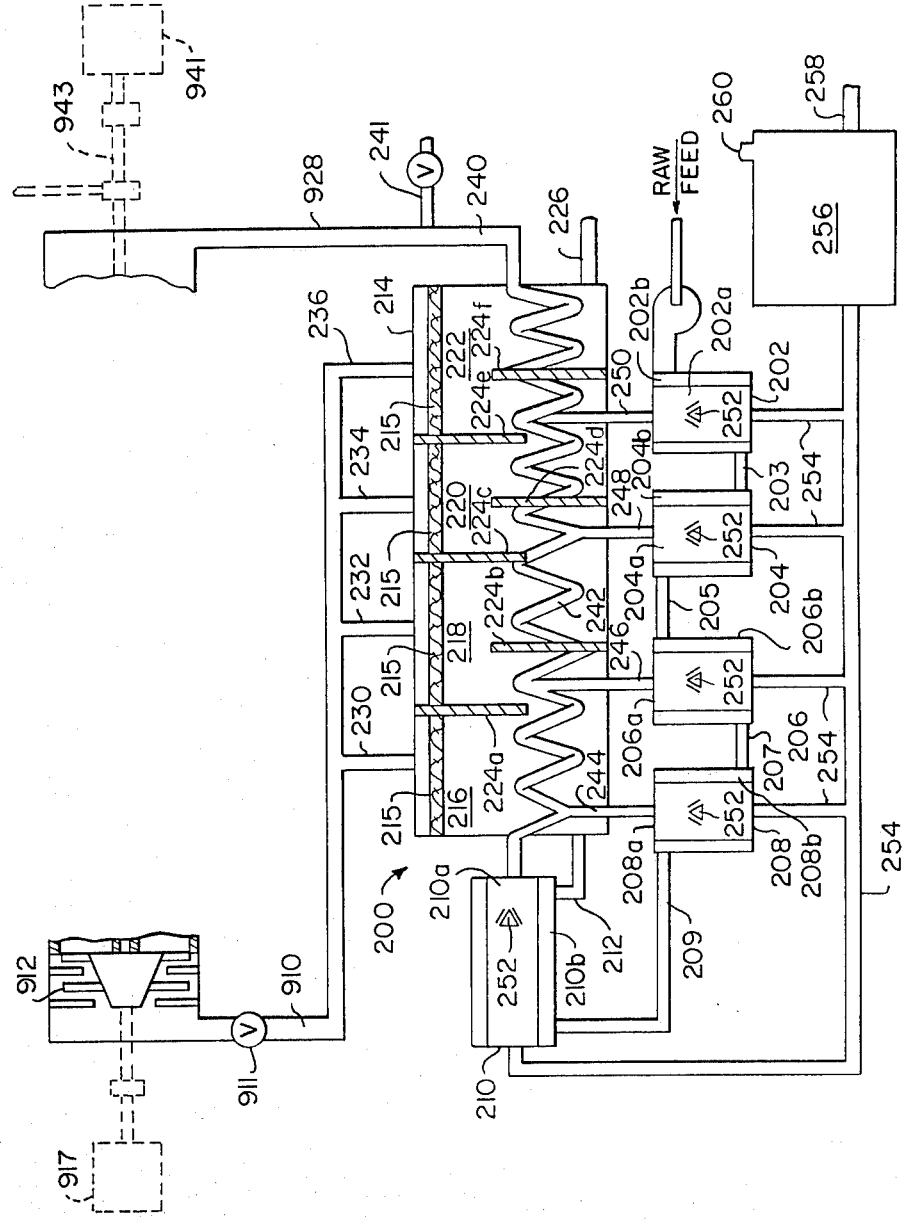
FIG. 4 illustrates schematically a multi-stage embodiment of the present invention, particularly suited for vacuum distillation-vapor compression treatment of waste water.

A multi-stage embodiment of the present invention, embodying a vacuum distillation-vapor compression system is illustrated in FIG. 4. As in FIG. 3, any vapor treatment section configuration shown in FIGS. 1, 1A, 1B, and 15 or otherwise described herein, may be used. A vacuum distillation-vapor compression system, as is well known in the art, has the advantage that, due to the multiple distillation stages, it can be constructed using equipment which is significantly smaller than would be required with a single stage system. In addition, a multi-stage system is substantially more flexible in usage than is a single stage system and, by appropriate location of the valves, one or more of the stages can be shut down during slack times, thereby producing a smaller quantity of distillate and permitting the cleaning and/or repair of stages which are not then in use. Multi-stage units are conventionally employed in flash distillation plants which usually require large bodies of cooling water, such as sea water, for efficient operation. The employment, as shown in FIG. 4, of a multi-stage system in a vacuum distillation embodiment has the advantage that it requires no large bodies of cooling water and can, accordingly, be located many miles from large bodies of water. Operating conditions for the multi-stage embodiment are substantially the same as for the single stage embodiment with acceptable temperatures for water in the boiler ($T_1$) as low as about just above 32° F., e.g., about 33° F., corresponding to a pressure ($P_1$) of about 0.006 atmospheres and as high a temperature as is consistent with avoiding scaling in the boiler, where appropriate, while at the same time maintaining an effective temperature difference between the vapor in the condenser return line and the condensing temperature ($T_1$) in the boiler such that the system can effectively treat large volumes of impure feed liquid. Although the precise temperature and pressure will vary from stage to stage by small amounts, as a general matter, the pressure and temperature is maintained substantially the same in all evaporation stages.

In the system designated by the numeral 200 depicted in FIG. 4, the impure liquid feed enters the shell side 202b of the heat exchanger-condenser unit 202 where it is heated by passage of partially condensed vapor through the condenser side 202a. The heated feed exits heat exchanger-condenser unit 202 via line 203 and enters the shell side 204b of another heat exchanger-condenser unit 204 where it is further heated by passage through the condenser side 204a of additional partially condensed vapor. In a similar manner, the feed liquid is successively heated by passage through the shell sides of heat exchanger-condenser units 206, 208 and 210. In each of these units heat is transferred to the feed liquid from partially condensed vapor passing through the condenser side 202a, 204a, 206a, 208a and 210a of the units and through lines 203, 205, 207 and 209 interconnecting the shell sides of the successive heat exchanger-condenser units. Finally, the heated feed liquid exits the shell side 210b of heat exchanger-condenser 210 through feed line 212 and enters multi-stage vacuum distillation boiler chamber 214 wherein it is heated to boiling in each of the stages 216, 218, 220 and 222 of the multi-stage chamber. In chamber 214 the feed flows over and under a plurality of baffles 224a, 224b, 224c, 224d, 224e and 224f through all of the evaporation spaces until unevaporated concentrated liquid feed containing the great bulk of impurities in the feed exits the multi-stage chamber 214 via line 226. The pressure within the evaporation space in multi-stage evaporation chamber 214 is maintained substantially at $P_1$ and $T_1$ by pressure regulating valve 911, which may be a spring or servo-controlled valve. The vapor produced in chamber 214 at $P_1$, $T_1$ exits the stages 216, 218, 220 and 222 through moisture separators 215 and vapor exit lines 230, 232, 234 and 236 respectively. The vapor recombines in vapor discharge line 910 which directs the vapor through pressure regulating valve 911 and into the vapor treatment section wherein it is substantially adiabatically compressed in compressor 912, and then further treated in the manner described in connection with FIGS. 1, 1A, 1B and 15, depending upon the vapor treatment section configuration employed, before entering multi-stage evaporation chamber condenser section coils 242 via return line 928. It should be understood that hot combustion gases may be used to provide make-up work in the vapor treatment section turbine and/or a motive system, such as system 50, may be used for driving the independent compressor, when such a compressor is used. Alternatively, both the make-up work and the energy for driving the independent compressor can come from motor means, such as motors 917 and 941, or from other suitable energy sources. In the condenser section, the vapor is at least partially condensed, transferring its latent heat to the heated feed liquid entering the chamber 214 via feed line 212. Excess steam may be diverted through line 241 to keep the system in thermal balance. The almost completely condensed vapor is tapped from condenser coil 242 in each of the stages 216, 218, 220 and 222 via condensate return lines 244, 246, 248 and 250 and led to the condenser sides 202a, 204a, 206a, 208a, 210a, of heat exchanger-condenser units 202, 204, 206, 208 and 210 wherein the vapors completely condense giving up their remaining heat to the feed liquid passing through the shell sides of these units. Flow is controlled through the condenser sides of the heat exchanger-units, which are preferably jet condenser units having pressure and expansion chambers therein, by servo or spring controlled pressure valves 252 in each of the condenser units, which valves serve to maintain the pressure on the condenser side and to assure that all vapors are condensed therein. The cooled condensate exits the condenser side of units 202, 204, 206, 208 and 210 via line 254 and its respective branches and is directed to storage tank 256 from which pure condensate may be drawn for general usage through line 258. Non-condensible gases exit via vent 260.

Inasmuch as the liquid feed flows serially through the various stages 216, 218, 220 and 222 of the evaporation chamber 214, the feed liquid becomes more and more concentrated as it flows from feed line 212 toward concentrated liquid discharge line 226, thus increasing the possibility of scaling in evaporation spaces 220 and 222 as compared with spaces 216 and 218. Proper control of the pressure and temperature in the multi-stage chamber 214 via valve 911 however, can avoid scaling. Another means of avoiding this increased likelihood of scaling is by modifying chamber 214 in such a manner that the baffles extend the entire height of the chamber 214, thereby defining enclosed evaporative spaces and by adding feed lines directly from the shell sides of heat exchanger-condenser units 202, 204, 206, 208, and 210 to each evaporative space so that fresh raw feed passes directly into each evaporative space independent of each other evaporative space.

Figure 5:
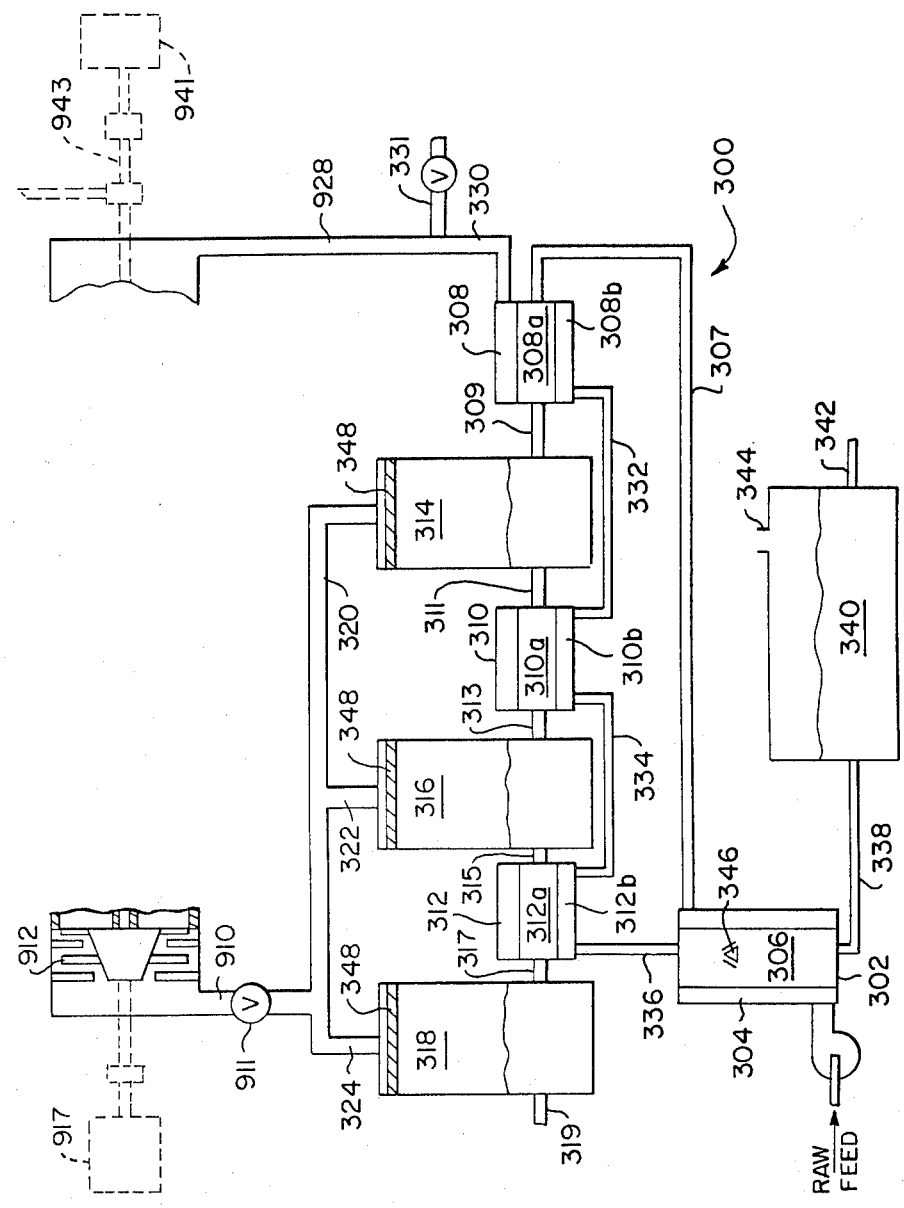
FIG. 5 illustrates schematically a multi-stage embodiment of the present invention, particularly suited for flash distillation-vapor compression treatment of waste water.
Figure 6:
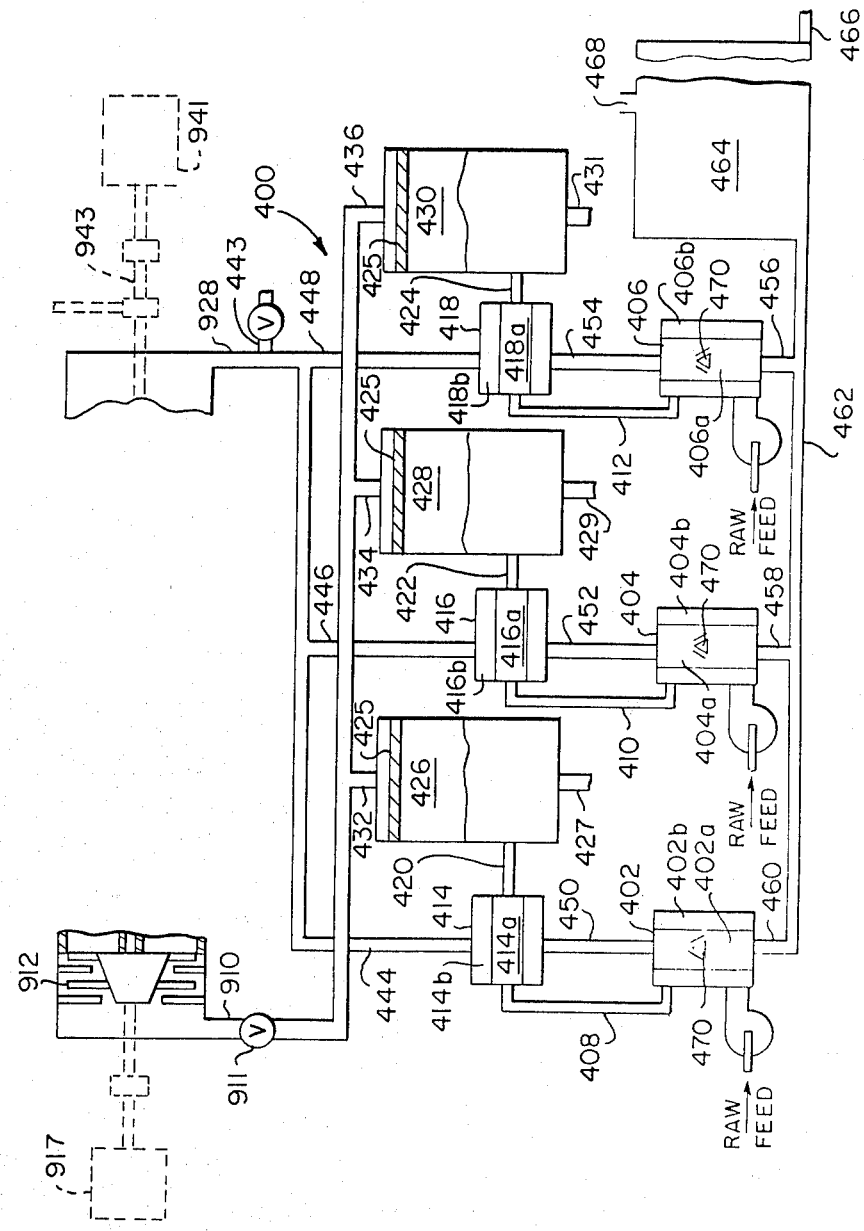
FIG. 6 illustrates schematically another multistage flash distillation embodiment of the present invention.

As has been hereinbefore indicated, the instant invention is equally applicable to flash distillation as the evaporative mode for forming the vapor in the system. The embodiments of FIGS. 5 and 6 are generally directed to flash distillation-vapor compression multi-stage systems. As is well known, in conventional multi-stage flash distillation systems the flash chambers are interconnected with baffles and weirs to permit the flow of distill and from the first to the last flash chamber and each chamber is operated at a successively lower temperature and pressure than the preceeding chamber. As a consequence, each of the lower temperature and pressure stages are significantly less efficient than the first flash distillation stage, which is one disadvantage of flash distillation systems. For example, U.S. Pat. No. 2,759,882 discloses a seven stage combined flash distillation and vapor compression evaporator wherein it is disclosed that of the 8.2 lbs of distilled water produced by the seven stages, the first stage produces 4.2 lbs. and the remaining six stages together only produce an additional four pounds, with the average efficiency of the last six stages about 1/6th the efficiency of the first stage. This disadvantage of multi-stage flash distillation systems is overcome in accordance with the present invention by maintaining the temperature and pressure at the same level in each of the flash chamber stages so that a high volume flow of distillate can be achieved. It is noteworthy that a characteristic of flash distillation systems is that the boilers do not contain heating means and, therefore, scaling of the heating means is not generally a problem. Of course, localized scaling is possible due to localized hot spots. However, this can generally be eliminated by maintaining the flow of feed liquid therein reasonably rapid so that heat is absorbed and dissipated as fast as it is formed with the result that hot spots are substantially eliminated.

Turning now to the embodiment of the invention shown in FIG. 5, the numeral 300 designates generally a flash distillation system into which impure liquid feed is fed and purified condensate is removed in an economical fashion. The raw liquid feed enters the shell side 304 of the heat exchanger-condenser unit 302, which is preferably a heat exchanger-jet condenser unit, in which the liquid feed is heated by the passage of partially condensed vapor through the condenser side 306 of the unit. The heated feed in liquid form exits the shell side 304 through feed line 307 and is passed to the tube side 308a of heat exchanger 308 where it is heated by hot vapor condensing in the shell side 308b. The heated feed passes through line 309 directly into flash chamber 314 where it flashes under the reduced pressure $P_1$ into the evaporative space above the liquid and flows as a vapor through moisture separator 348 and line 320, combined vapor line 910 and valve 911 to turbine compressor 912. Valve 911 is a pressure control valve which regulates the pressure at $P_1$ within each of the flash chambers 314, 316 and 318. The feed liquid which does not flash in chamber 314 exits the chamber through line 311 and enters the tube side 310a of heat exchanger 310 wherein it is heated by the flow of condensing vapor in the shell side 310b, which condensing vapor entered the shell side of heat exchanger 310 through line 332 from heat exchanger 308. The heated feed exits heat exchanger 310 through line 313, flashes in flash chamber 316 under reduced pressure ($P_1$) and flows as a vapor through moisture separator 348, line 322 and combined vapor line 910 to the vapor treatment section. In a similar manner, the unevaporated heated feed passes from flash chamber 316 through line 315 into the tube side 312a of heat exchanger 312 wherein it is further heated by vapor from heat exchanger 310 through line 334 condensing in the shell side 312b. The feed continues through line 317 into flash chamber 318 where it is flashed at pressure $P_1$ into vapor, passed through moisture separator 348 and led by vapor line 324 into combined vapor line 910 and then to the vapor treatment section. Any unflashed liquid feed exits the system as concentrated waste through line 319. The combined evaporated vapors in line 910 passing valve 911 at pressure and temperature $P_1$, $T_1$ are directed into the vapor treatment section of the system. It will be appreciated that any of the vapor treatment section configurations shown in FIGS. 1, 1A, 1B or 15 may be employed in this embodiment of the invention. In the vapor treatment section, the vapors are substantially adiabatically compressed by compressor 912 to $P_2$, $T_2$ and then further treated in the manner described in connection with FIGS. 1, 1A, 1B and 15, depending upon the vapor section configuration employed. It should be understood that hot combustion gases may be used to provide make-up work in the turbine and a motive power system, such as system 50, may be used for driving the independent compressor when such a compressor is used. Alternatively, both the make-up work and the energy for driving the independent compressor can come from motor means, such as motors 917 and 941, or from other suitable energy sources. The compressed vapor returns to the shell sides of heat exchangers 308, 310 and 312 via return line 928 and lines 332 and 334, and is directed from the last heat exchanger shell 312b through line 336 into the condenser side 306 of heat exchanger-condenser unit 302. Controlling flow through the condenser side 306 is spring or servo operated pressure valve 346 which serves to maintain the pressure on condenser side 306 and to assure that all vapors are condensed therein. Line 338 carries condensed vapor into storage container 340 from which pure condensate may be drawn for general usage through line 342. Non-condensible gases exit via vent 344. Excess steam may be diverted from return line 928 through line 331 to keep the system in thermal balance.

A preferred form of flash distillation-vapor compression system is illustrated in FIG. 6. In the system of FIG. 6, designated generally as 400, the raw liquid feed separately enters the shells 402b, 404b, 406b, of heat exchanger condenser units 402, 404 and 406, which are preferably heat exchangerjet condenser units. In the heat exchanger-condenser units, the raw feed is heated by the flow of partially condensed vapor through the condenser side 402a, 404a and 406a of the units. The partially heated feed passes out of the units 402, 404 and 406 through feed lines 408, 410 and 412, respectively, into the tube sides 414a, 416a and 418a of heat exchanger units 414, 416 and 418. In these heat exchanger units, the feed is further heated by the condensing vapor entering the shell sides 414b, 416b and 418b of the heat exchanger units through vapor return lines 444, 446 and 448. The heated feed from each of the heat exchangers enters its respective flash chamber 426, 428 and 430 through feed lines 420, 422 and 424, respectively. The heated feed flashes under the reduced pressure $P_1$ at a temperature $T_1$ in each of the flash chambers. Any unflashed concentrated waste is removed from the flash chambers through line 427, 429 and 431, respectively. The flashing vapor passes moisture separators 425 and is collected in vapor lines 432, 434 and 436 and combined vapor line 910 and is passed through pressure control valve 911 into the vapor treatment section. Valve 911 regulates the pressure in each of the flash chambers 426, 428 and 430 to $P_1$. The vapors passing valve 911 pass into the vapor treatment section of the system. It will be appreciated that any of the vapor treatment section configurations shown in FIGS. 1, 1A, 1B or 15 may be employed in this embodiment of the invention. In the vapor treatment section, the vapors are substantially adiabatically compressed and then further treated in the manner described in connection with FIGS. 1, 1A, 1B and 15, depending upon the vapor treatment section configuration employed.

It should be understood that hot combustion gases may be used to provide make-up work in the turbine and a motive power system, such as system 50, may be used for driving the independent compressor when such a compressor is used. Alternatively, both the make-up work and the energy for driving the independent compressor can come from motor means, such as motors 917 and 941, or form other suitable energy sources. The compressed vapors return to heat exchangers 414, 416 and 418 through combined vapor return line 928 and then through individual vapor return lines 444, 446 and 448 to the shell sides 414b, 416b, 418b of the heat exchangers where the hot returning vapors at least partially condense, transferring their latent heat to the feed liquid on the tube sides of the respective heat exchangers. The almost completely condensed vapor exits the heat exchangers through lines 450, 452 and 454 and flows into the condenser side 402a, 404a and 406a of units 402, 404 and 406 wherein further condensation takes place and the heat thereby given up is transferred to the entering raw liquid feed. Controlling flow through the condenser sides 402a, 404a and 406a are spring or servo-operated pressure valves 470 which serve to maintain the pressure on the condenser sides of units 402, 404 and 406 and to assure that all vapors are condensed therein. The condensate is carried through condensate return lines 456, 458 and 460 and combined condensate return line 462 into storage container 464 from which pure condensate may be drawn for general usage through line 466. Non-condensible gases exit via vent 468. Excess steam may be diverted from return line 928 through line 443 to keep the system in thermal balance.

The parallel-parallel embodiment of flash distillation-vapor compression system shown in FIG. 6 is probably the most efficient type because concentration of waste can be individually adjusted from each flash chamber by adjusting the feed flow into each chamber. In addition, different types of raw feed having a common carrier solvent, e.g., water, can be introduced into each chamber and valuable by-products can be separated from the common solvent of the feeds in each chamber and separately recovered.

The invention has thus far been described in its simplest forms and has, in each embodiment, utilized but a single turbine compressor operated by a single turbine motor. However, the configuration of the turbine compressor 912/turbine motor 916 need not be as simplistic as shown in FIGS. 1, 1A, 1B or 15. Rather, considerable flexibility can be introduced into the system if the compressor, the turbine, the compressor-turbine combination or the compressor-mixing chamber-turbine combination is configured to meet the requirements and demands of the particular system. For illustrations of particular arrangements which are useful and are all operable in the systems shown in FIGS. 1, 1A, 1B, 2–6 and 15 attention is invited to FIGS. 7–14 and the description thereof which follows in which the numerical designations of FIGS. 1, 1A and 1B have been used for convenience and in which it has been assumed that make-up work is supplied, at least in part, by direct mixing of hot gases. It will, of course, be appreciated that FIGS. 7–14 are equally applicable in conjunction with the FIG. 15 embodiment and/or where no hot-gas make-up work is utilized.

Figure 7:
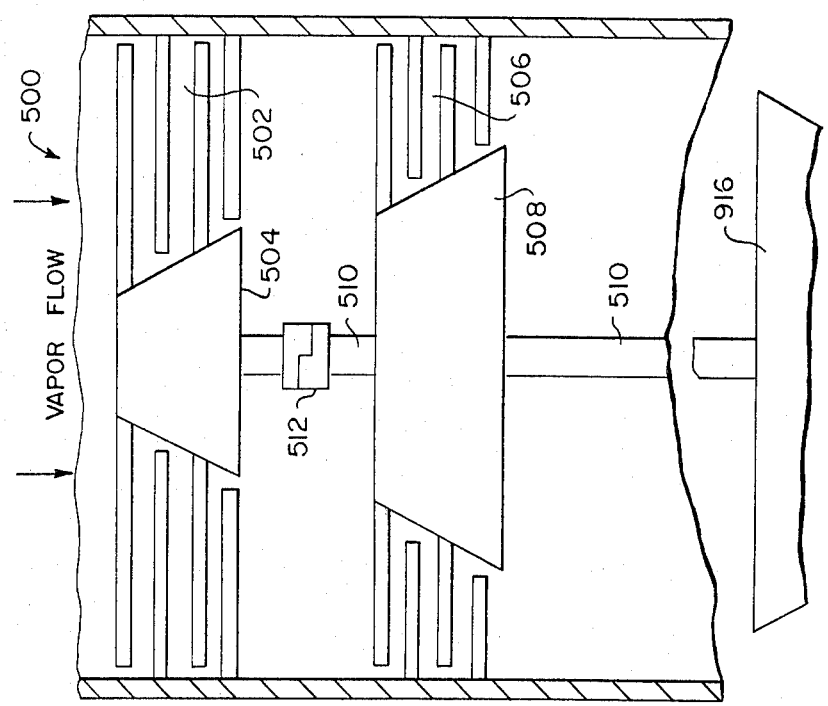
FIG. 7 illustrates schematically a clutched compressor unit which can be operated by a turbine motor as an optional turbine-compressor unit useful in the many embodiments of the present invention.

Referring first to FIG. 7, there is illustrated schematically a clutched compressor unit designated by the numeral 500, which unit may be used in lieu of turbine compressor 912 in FIGS. 1, 1A, 1B and 15. The clutched compressor unit 500 is operated by a turbine 916 (partially shown) and includes a first compressor 502 having a compressor spindle 504 and a second compressor 506 having a compressor spindle 508 which is substantially larger than is spindle 504. Spindles 504 and 508 are linked through shaft 510 and clutch 512. Clutch 512 can be a variable clutch which causes the smaller spindle to rotate at a different velocity than the larger spindle, i.e., clutch 512 may be a variable gear box generally similar to an automobile transmission, which permits the compression ratio to be varied at will. Such a system is valuable as an aid in adjusting system operating variables depending upon the density of the vapor and the need to increase or decrease the flow rate through the system.

Figure 8:
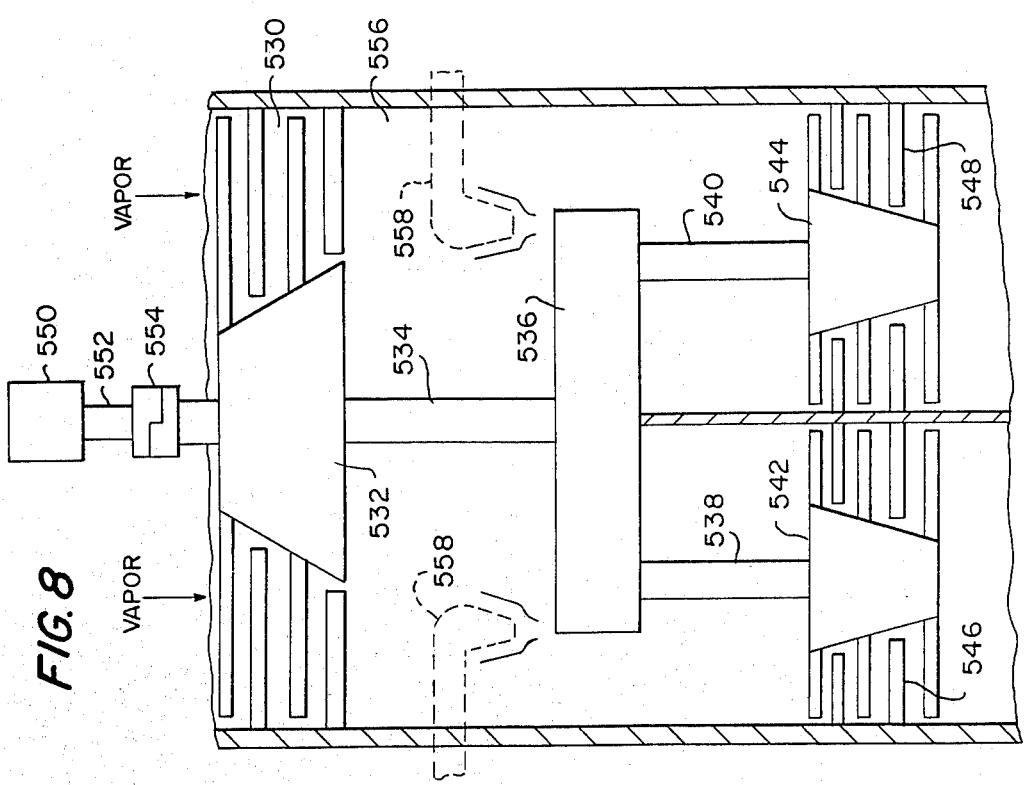
FIG. 8 illustrates schematically two turbine motors operating a single turbine compressor as an optional turbine-compressor unit useful in the many embodiments of the present invention.

FIG. 8 illustrates two turbine motors operating a single turbine compressor through a clutch and gear box. Compressor 530 has its spindle 532 linked through shaft 534 to clutch and gear box or transmission gear box 536. Shafts 538 and 540 link gear box 536 with turbine spindles 542 and 544 of turbines 546 and 548. In operation, starting motor 550 acting through shaft extension 552 and clutch 554 starts spindle 532 of compressor 530 rotating. Power is transmitted through shaft 534 to gear box 536 and, through shafts 538 and 540, spindles 542 and 544 of turbines 546 and 548 are also caused to rotate. Hot, clean combustion gases are mixed with the vapor flowing through space 556 as the gases are emitted into space 556 through injectors 558. The combined vapor flow and combustion gases transmit rotary power to turbines 546 and 548 and through transmission gear box 536 to compressor 530. A particular advantage of this configuration is that it is more flexible than two separate compressor-turbine combinations and, at the same time, more economical.

Figure 9:
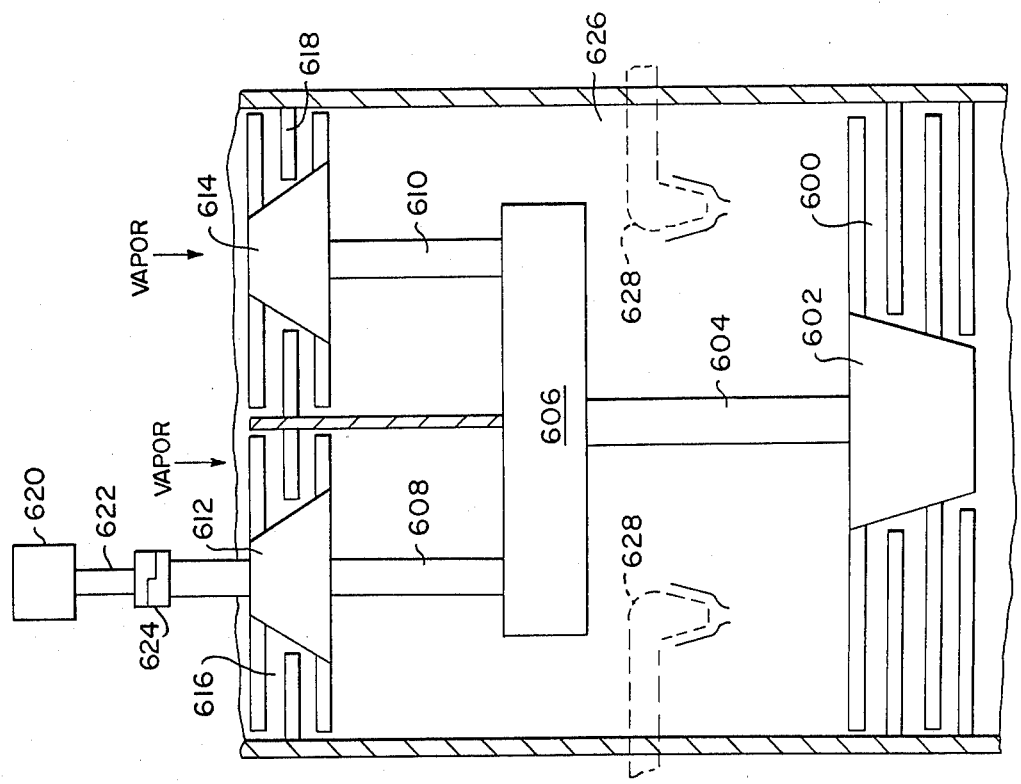
FIG. 9 illustrates schematically a single turbine motor operating two turbine compressors as an optional turbine-compressor unit useful in the many embodiments of the present invention.

FIG. 9 illustrates a single turbine motor having a spindle 602 linked through shaft 604 to gear box 606 which gear box is directly linked through shafts 608 and 610 to the spindles 612 and 614 of compressors 616 and 618. In operation, starting motor 620 operating through shaft extension 622 and clutch 624 starts spindle 612 of compressor 616 turning and, in turn, causes compressor 614 and turbine 600 to also rotate. Hot, clean combustion gases are mixed with the vapor flowing through space 626 as the gases emit from injectors 628. The combined vapor flow and hot combustion gas flow motivates turbine 600 which, through gear box 606, can operate either or both of the compressors 616 and 618. This configuration has advantages similar to those of the configuration illustrated in FIG. 8.

Figure 11:
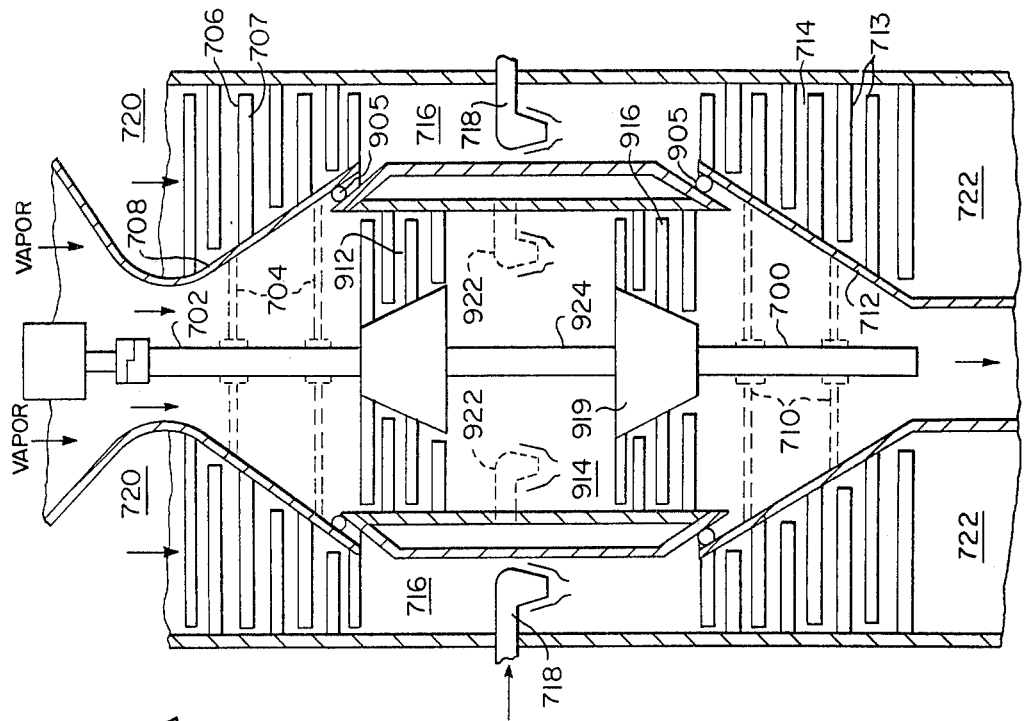
FIG. 11 illustrates schematically concentric compressor-turbine combinations, one of which combinations can be powered by dirty, hot gases, as an optional turbine-compressor unit useful in the many embodiments of the present invention.
Figure 10:
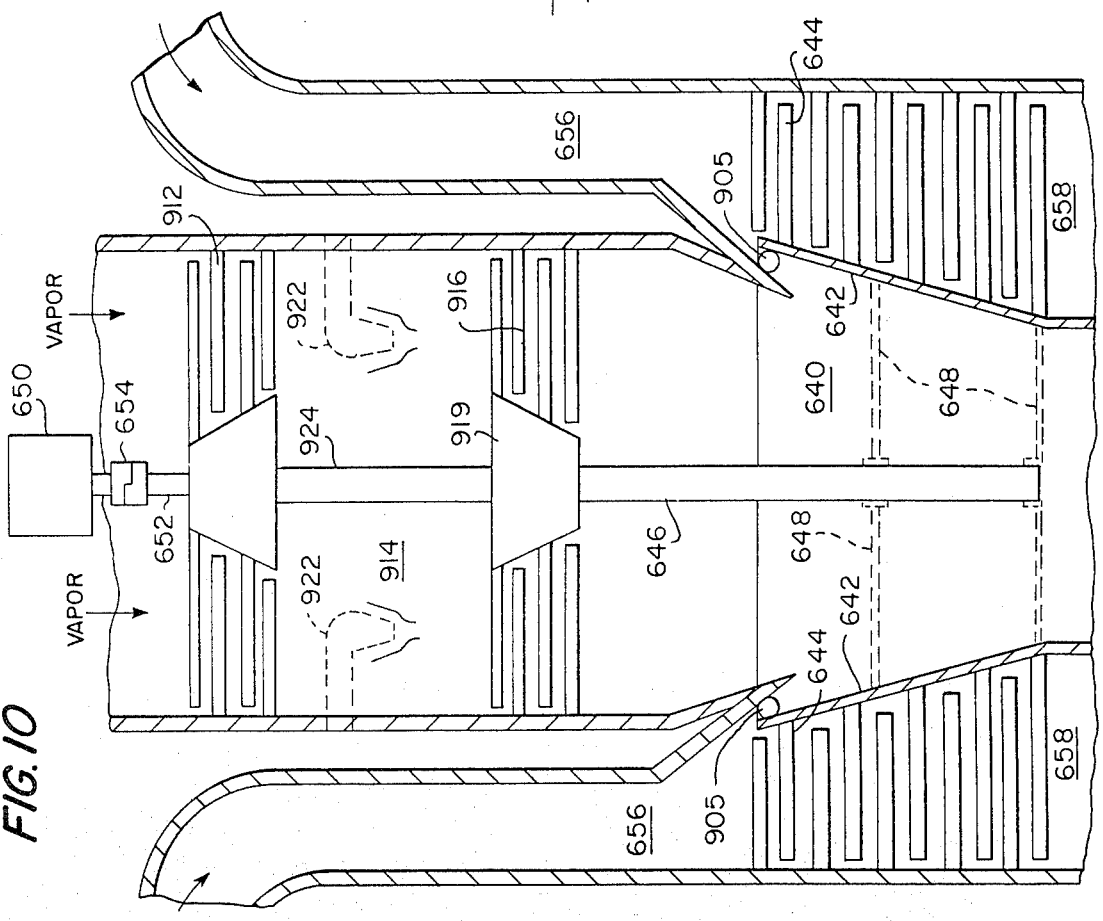
FIG. 10 illustrates schematically two turbines, one of which can be powered by dirty, hot gases, operating a turbine compressor as an optional turbine-compressor unit useful in the many embodiments of the present invention.

FIGS. 10 and 11 illustrate embodiments of the compressor-turbine combination which permit the use of hot, dirty combustion gases in addition to hot, clean combustion gases to provide additional motive power for driving the turbine and, in turn, through the linked shaft, for driving the vapor compressor as well. In these embodiments, the hot, dirty combustion gases do not actually mix with the vapor in the system, and, therefore, the purity of the condensate produced by the system is not compromised by use of dirty combustion gases for additional motive power. Referring first to FIG. 10, there is shown a configuration which includes the conventional compressor-turbine combination taught in FIGS. 1–6, which configuration includes a mixing chamber for mixing hot, clean combustion gases with the vapor flowing through the turbine and the compressor. In addition, the unit illustrated in FIG. 10 includes a hot, dirty combustion gas driven turbine which increases the shaft power available for driving the compressor. The unit of FIG. 10 includes compressor 912 linked through shaft 924 to turbine 916 and vapor-combustion gas mixing chamber 914 defining the space between the turbine and the compressor. Injectors 922 emit hot, clean combustion gases for mixing the vapor with the result that the combined flow of the vapor and the combustion gases operate turbine 916, which, through shaft 924, drives compressor 912. The system also includes a dirty combustion gas operated turbine 640 which consists essentially of a hollow spindle 642 and blades 644 attached to the outside surface of the hollow spindle. The spindle 642 is drivingly linked to shaft 646 through supports 648. Shaft 646 is operatively linked with the spindle 919 of turbine 916 which spindle is joined through shaft 924 to the spindle of compressor 912. In operation, the system is energized by starting motor 650 acting through shaft extension 652 and clutch 654. Dirty combustion gas turbine 640 is disposed with its blades arranged in flow space 656 which is annularly arranged with respect to vapor and clean combustion gas flow space 914 and which is separated therefrom by a solid paritition, and sealing ring 905. In this manner, hot, dirty combustion gases are directed through space 656 to act on turbine blades 644 which, through spindle 642 and supports 648, rotate shaft 646. The expanded dirty combustion gases exhaust from the turbine 640 into space 658 in such a manner that they never combine or mix with the vapor or the clean combustion gases.

FIG. 11 illustrates a completely concentric unit wherein one compressor-mixing chamber-turbine combination surrounds and is directly linked to another compressor-mixing chamber-turbine combination. In this configuration, the outer compressor-mixing chamber-turbine combination supplies rotary power to the inner system to improve the performance of the inner system. The inner system, which is the compressor-mixing chamber-turbine combination disclosed in FIGS. 1, 1A and 1B, includes compressor 912 linked through shaft 924 to turbine motor 916 and mixing chamber 914 between the compressor and the turbine in which clean combustion gases emitting from injectors 922 admix with the vapor flowing through chamber 914 to operate turbine 916. Extending from the spindle of compressor 912 and from spindle 919 of turbine 916 are shaft members 700 and 702 respectively. Connected to shaft 702 are supports 704 which rotate compressor 706 through its hollow spindle 708. Connected to shaft 700 are supports 710 through which shaft 700 is rotated by the hollow spindle 712 of turbine 714. The blades 707 of compressor 706 and 713 of turbine 714 are arranged in an annular space surrounding the compressor-turbine unit 912,916. The annular space is separated from the vapor clean combustion gas flow space by a solid parition, and sealing ring 905. Turbine 714 is operated by combustion gases, which may be dirty gases, emitted into space 716 through injectors 718. In space 716 the combustion gases may be mixed with air drawn therein from space 720 upstream of compressor 706 which air is drawn into the system and compressed by compressor 706. The air admixed with the hot combustion gases exhausts through space 722 and never comes in contact with the vapor and clean combustion gases which move through space 914. As the dirty combustion gases and air drawn in through space 716 pass through turbine 714, they do work on the turbine blades 713 causing turbine 714 to rotate and to transmit power through supports 710 to shaft 700, which power is utilized by coaxial compressor 912 in doing work on the vapors which are drawn into space 914. In an alternative form of this embodiment, space 716 may operate as a combustion chamber and injectors 718 used to inject fuel into the space for combustion with the air drawn in from space 702.

Numerous modifications can be made to the configuration illustrated in FIG. 11 to alter it and/or improve it for particular usages. Thus, supports 704 and 710 could be formed into air foil shaped fans to assist in the movement of large masses of vapor. Still another modification involves clutching and gearing the outer compressor-turbine combination to the inner compressor-turbine combination in order that the rate of rotation of the latter could be varied with respect to the former. Another useful modification is the addition of further compressor-turbine combinations in concentric relationship to the two shown in FIG. 11, all with the purpose of increasing the motive power available for compression in compressor 912 and of utilizing available energy sources, such as dirty combustion gases, in as economical a manner as is possible. The fundamental advantage of the configuration of FIG. 11 is that it enables utilization of as many different combustion gas sources as may be available at the system location for supplying economical power to compress the vapors flowing into space 914.

Figure 13:
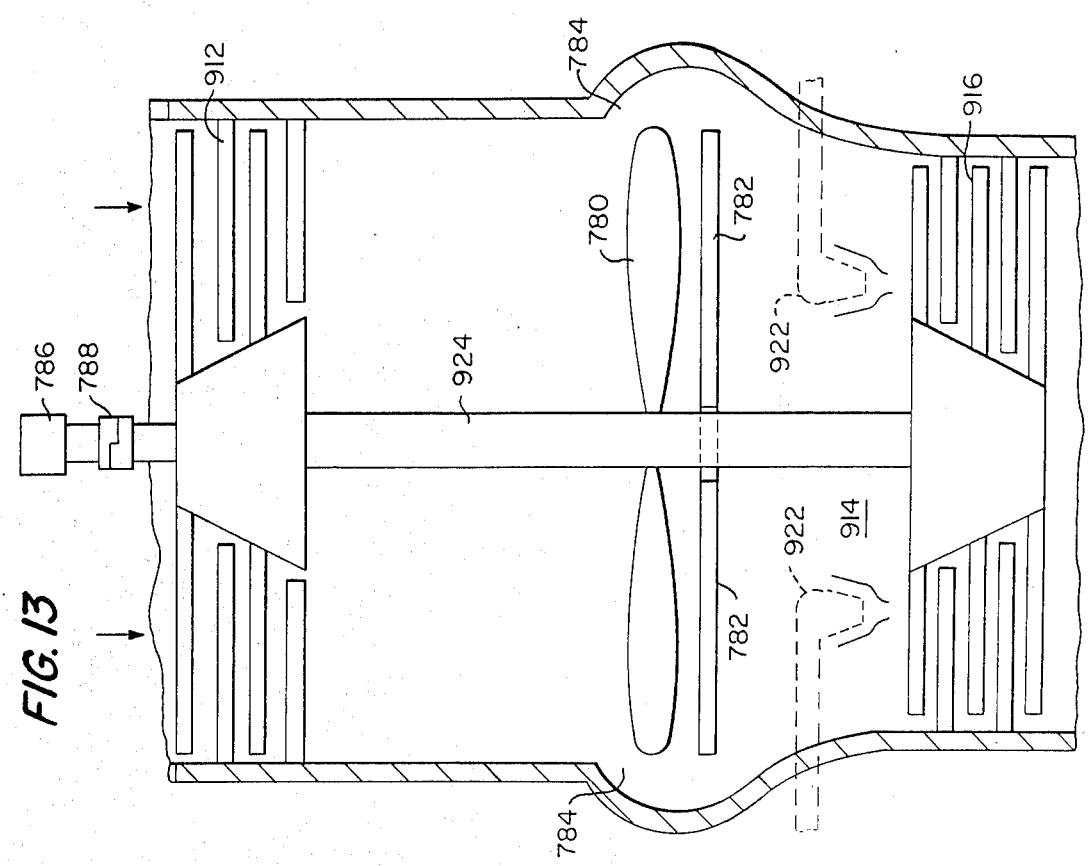
FIG. 13 illustrates schematically a centrifugal compressor and a turbine compressor operated by a single turbine motor as an optional turbine-compressor unit useful in the many embodiments of the present invention.
Figure 12:
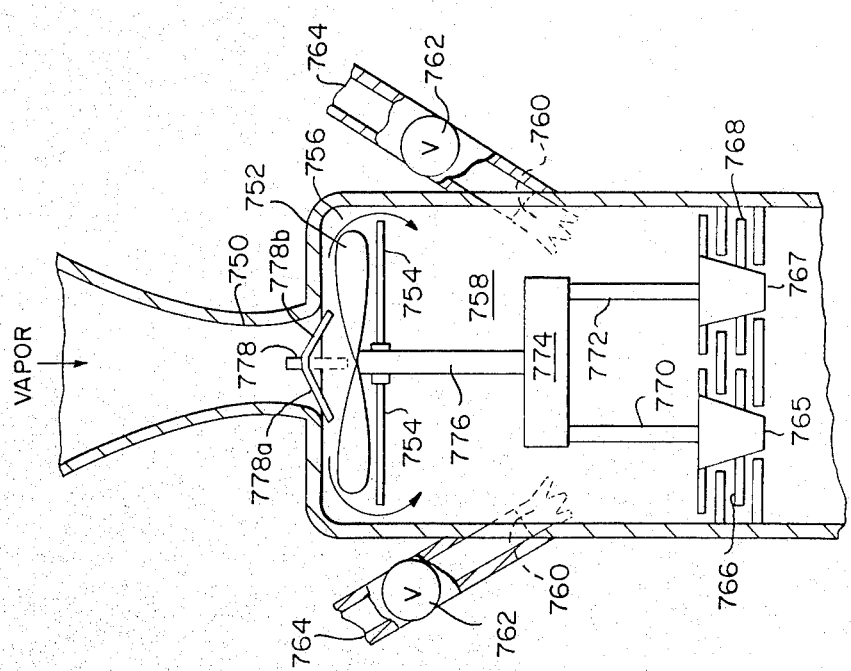
FIG. 12 illustrates schematically a centrifugal compressor operated by two turbine motors in tandem as an optional turbine-compressor unit useful in the many embodiments of the present invention.

FIGS. 12 and 13 show still other configurations for the compressor-mixing chamber-turbine unit of FIGS. 1, 1A and 1B. Specifically, these FIGS. 12 and 13 illustrate the use of centrifugal compressors instead of or in addition to turbine compressors. Centrifugal compressors have the advantage that they readily pass condensed liquid via the large waterways at the tips of the compressor impellers. Referring first to FIG. 12, there is shown an inlet nozzle which leads from the evaporative unit directly to the impeller of a centrifugal compressor. Nozzle 750, which is optionally a venturi nozzle but may be merely an inlet duct, directs the hot vapor to impeller 752 of a centrifugal compressor which includes back plates 754 to prevent the flow of vapor straight through and to assist impeller 752 in directing and concentrating the flow of vapor toward the sides 756 of the chamber off the tips of the impeller. The compressed vapor passing centrifugal impeller 752 flows past back plates 754 and into space 758 where it mixes with hot, clean combustion gases issuing from injectors 760 which are shown in FIG. 12 to be optional multi-nozzle injectors. The flow of combustion gases through injectors 760 is controlled by flow valves 762 disposed in the arms 764 leading to the injectors. The vapor passing the centrifugal compressor admixes with the combustion gases and together the vapor and gases motivate turbines 766 and 768 disposed in tandem. As spindles 765 and 767 of turbines 766 and 768 are caused to rotate, they in turn rotate shafts 770 and 772 linked through clutch and transmission box 774 to shaft 776. Rotation of shaft 776 operates impeller 752 of the centrifugal compressor. As in the other configurations disclosed herein, the system can be started rotating initially utilizing a starter motor through a clutched system shaft-linked to one of the spindles 765, 767 of the tandem turbines. Optional butterfly valve 778 is shown disposed in the neck of entrance nozzle 750 to control the flow direction of the vapors entering from the boiler. The butterfly valve 778 is preferably arranged in such a manner that arms 778a and 778b can be brought together to fully open nozzle 750 and, in that position, to offer little or no resistance to vapor flow therethrough. FIG. 13 illustrates turbine compressor 912 shaft linked through shaft 924 to turbine motor 916 and clean combustion gas injectors 922 disposed in mixing chamber 914 to emit clean combustion gases for combination with the vapor flowing through compressor 912 to conjointly operate turbine 916. Starting motor 786 and clutch 788 are provided for initial start-up of the system. In this embodiment, however, a centrifugal impeller 780 is operated by shaft 924 in conjunction with back plates 782. As described in connection with FIG. 12, the impeller together with the back plates directs and concentrates the flow of vapor toward the ends of the impeller into spaces designated generally as 784 whereupon the vapors are additionally compressed prior to admixing in space 914 with the clean combustion gases emitting from injectors 922.

Figure 14:
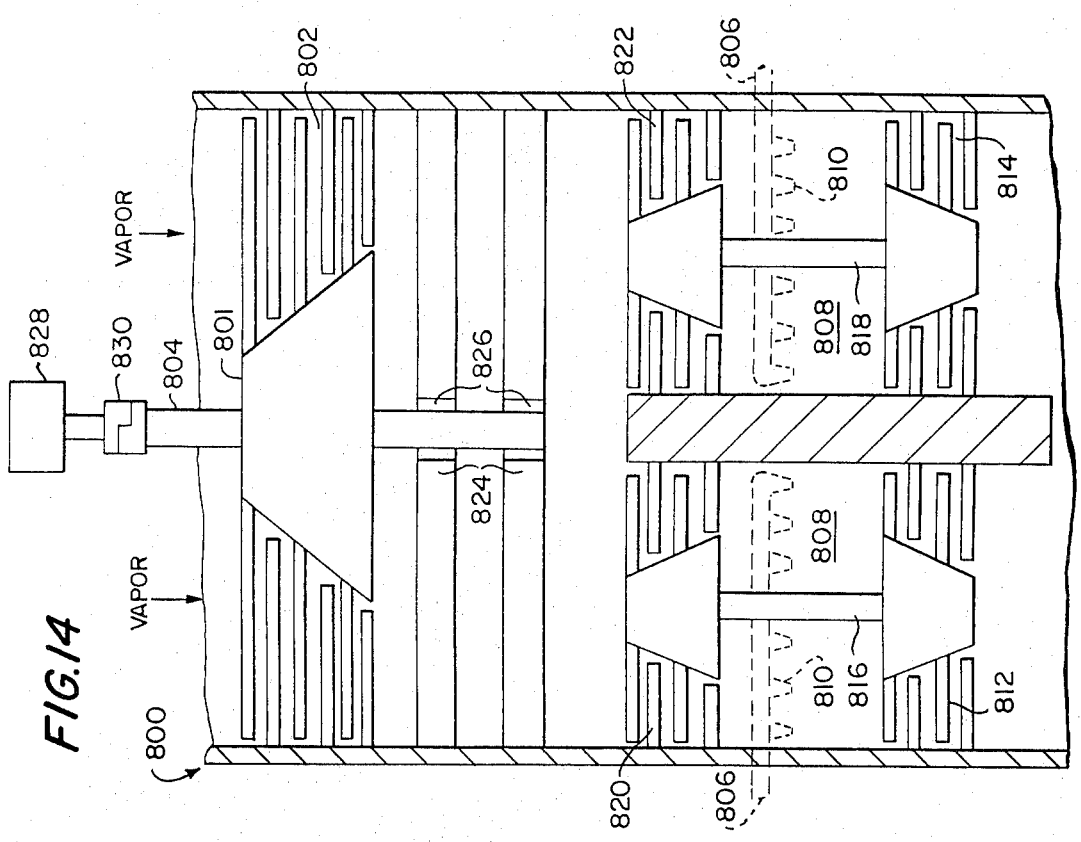
FIG. 14 illustrates schematically an optional free wheeling compressor unit with two turbine driven compressors in tandem, which unit is useful as the turbine-compressor unit in the many embodiments of the present invention.

Yet another useful configuration for the compressor-mixing chamber-turbine unit is illustrated generally at 800 in FIG. 14. The unit shown consists of two compressor turbine combinations in tandem together with a free-wheeling compressor upstream of the tandem combinations. Specifically, free-wheeling compressor 802 is disposed in the path of vapor entering the unit and permitted to rotate at its own rate which is dependent only on the flow rate of vapor therethrough. Starter motor 828 and clutch 830 are shown operating on shaft 804 to which spindle 801 of the free-wheeling compressor is also connected. Hot clean combustion gases enter the system through feed lines 806 and are emitted into mixing chamber 808 of each tandem unit through injectors 810 therein. The hot, clean combustion gases admix with the vapor flowing through chambers 808 and the vapor and gases together operate on turbines 812 and 814. Turbines 812, 814 are linked respectively, through shafts 816, 818 to compressors 820, 822, which compressors are operated by rotation of turbines 812 and 814. As compressor 820 and 822 are rotated, vapor is drawn into the unit past free-wheeling compressor 802 causing the compressor to rotate while supported by supports 824 and bearings 826. The configuration of FIG. 14 has the obvious advantage of affording a larger through-put while utilizing less power due to the presence of the free-wheeling compressor 802. Depending upon the motive power necessary for compression in the system, either or both of turbines 812 and 814 can be used.

Substantially similar results as those attainable with the vapor treatment sections of the embodiments illustrated in FIGS. 1, 1A and 1B can be achieved without need for bypassing the turbine. In such a system, illustrated in FIG. 15, bypass arms 920, injectors 926, valves 918 and mixing section 925 can be eliminated and the system operated substantially as described in copending application Ser. No. 681,290 filed Apr. 28, 1976.

Referring now to FIG. 15, a vacuum distillation-vapor compression system is shown generally at 10. The system consists in its essential a pects of a boiler unit 12 including a condenser section 14 therein, a variable compression ratio turbine compressor 16 operated through shaft 18 by turbine motor 20, means for supplying make-up work to the turbine motor 20, and an independent second compressor 24 downstream of the turbine motor 20. The means for supplying make-up work may include motor means, such as motor 28, (shown in phantom) which can be powered by electricity, gasoline, diesel fuel, and the like, directly linked through shaft 29 to turbine shaft 18 for directly driving the turbine. Alternatively, or in addition, the means for supplying demand work may include a mixing chamber 22 upstream of the turbine motor 20 and means 26 for supplying hot gases to mixing chamber 22. Other well known techniques for supplying energy can also be used, but are generally less desirable. To understand the operation of the system 10, the path of raw feed, e.g., impure water, therethrough can be charted. Initially, a starter motor, such as motor 28, is energized to rotate shaft 18 through clutch and gear box 30. Compressor 16 and turbine 20, which are linked to shaft 18, also rotate when the motor 28 is operated. During start-up the variable compression ratio compressor 16 is allowed to rotate for a time sufficient for a vacuum to be drawn on the evaporative side of boiler 12. The compression ratio and the extent of the vacuum is predetermined, as will be seen hereinafter, based upon the desired operating parameters of the system and the temperature of the influent water and is controlled and monitored by variable pressure valve 32 in duct 42 joining the boiler 12 and first compressor 16. Means 26 for supplying hot gases to mixing chamber 22, when supplied hot gases are the means employed for supplying make-up work, are operated to motivate turbine 20 to keep it running during start-up and to heat the tubes 34 in condenser section 14.

In this embodiment, motive system 50, as previously described herein, constitutes means for supplying the hot gases although it will be appreciated that any known way of providing high temperature, high pressure gases, e.g., burning garbage at high temperature to produce high temperature, high pressure steam, may be used. At the same time, motive system 50 may be used to operate independent compressor 24. The independent compressor 24 need not, of course, be operated by a motive power system 50 as shown. Instead, the compressor could be operated directly by electrical, diesel or gasoline motor mean, such as motor means 25 (shown in phantom).

Assuming the system of FIG. 15 to include a mixing chamber and a hot gas source as the means for supplying make-up work to turbine 20, typical operation of the system will be better understood from the following description.

Feed water enters system 10 through duct 38 and is rapidly heated to the boiling temperature, which depends on the vacuum level in the boiler, by heat transferred from the condensing vapor in hot condenser tubes 34. Concentrated feed water waste, containing a large proportion of the impurities therein, is removed via discharge line 33. The vapor produced at $P_1$ and $T_1$ (the pressure and temperature in the boiler) is drawn through moisture separator 40 into duct 42 joining the boiler 12 and the first compressor 16 and is substantially adiabatically compressed by compressor 16 to $P_2$ with a resulting heating of the vapor to $T_2$. The heated vapor mixes with the hot, clean combustion gases emitting from injectors 36 in mixing chamber 22, which may be a mixing injector, mixing aspirator, jet mixer or any other configuration known to be suitable for mixing vapors having different pressures in such a manner that a partial vacuum is created upstream of the actual mixing point. The partial vaccum is useful in drawing the non-injected vapor into the mixing chamber and thereby for enhancing the mixing. The temperature of the combustion gas is higher than the temperature of the heated vapor at this point although there is a substantially smaller flow rate of combustion gases than of vapor. The direct mixing results in a substantially isobaric increase of vapor temperature by at least about 2° K. to $T_3$ while pressure remains substantially the same, i.e., $P_3$ equals $P_2$. The mixed vapor-combustion gas stream substantially adiabatically expands through turbine 20 to reduced pressure and temperature $P_4$ and $T_4$ and, in so doing, does work $W_2$ on the turbine to operate it. Since the turbine 20 and compressor 16 are directly linked by shaft 18, the amount of work $W_2$ done by the vapor on the turbine is equal to the amount of work $W_1$ done on the vapor by the compressor, i.e., $W_1$ equals $W_2$. Inasmuch as the combustion gas serves primarily to heat the vapor and since the combustion gas flow rate is only a small fraction of the vapor flow rate (e.g., about 125,000 gal/hr of vapor to less than 1,000 gal/hr of combustion gas), the work $W_2$ is largely done by the vapor in a steady state condition. The expanded and reduced temperature vapor exhausting from the turbine 20 then passes through independent compressor 24 and is substantially adiabatically compressed to increase its pressure to $P_5$ and its temperature to $T_5$. These pressure and temperature conditions, $P_5$ and $T_5$, represent the initial vapor conditions in the condenser tubes 34 as well. Therefore, the compression ratio in compressor 24 is selected to provide a final pressure at least equal to ambient and to create the desired temperature differential for effective heat transfer in the condenser tubes 34 from the condensing vapor to the feed water entering duct 38. The heat transfer temperature differential must be high enough that large volumes of feed water can be accomodated in this system within the practical limits imposed by reasonable condenser size. It is for achieving reasonable condenser size that the independent compressor is so important in this embodiment, particularly where, as here, the compression ratio of the independent compressor can be adjusted to accomodate variations in feed water flow rate and feed water temperature. Following condensation, purified condensate is drawn off through duct 39.

In an alternative operative embodiment, make-up work may be furnished by motor means, such as motor 28, the independent compressor may be directly driven by motor means, such as motor 25, and means 26 and the associated mixing and gas supply apparatus partially or totally eliminated.

The system illustrated in FIG. 15 in its many embodiments, may be used in conjunction with the various turbine-compressor configurations illustrated and described in FIGS. 7–14. In addition, the modification of FIG. 2, wherein a fraction of the vapor returning to the condenser tubes is diverted and directly injected into the boiler, is equally applicable in conjunction with the system of FIG. 15.

EXAMPLE VII

This Example, employing the system of FIG. 15, utilizes impure water as the feed liquid and assumes an initial boiler temperature $T_1$ of 140° F. from which the initial boiler vapor pressure $P_1$ under assumed saturated conditions is 2.889 psia. The compression ratio for compressor 16 is 15:1. Therefore $P_2 = 15\ P_1 = 43.335$ psia.

From the ideal gas law applied to adiabatic compressions and expansions, it is known that $$T_2/T_2 = (P_2/P_1)^{0.2445}$$

Solving For $T_2$ and substituting:

$$T_2 = 703° \text{ F.}$$

In this Example, all make-up work added to turbine 20 is provided by direct driving the turbine using an externally powered motor. Nevertheless, because of the direct shaft link between the turbine and the compressor, $W_1$, the work done by the compressor on the vapor equals $W_2$, the work done on the turbine by the vapor plus the direct drive work added to the turbine.

$$W_1 = C_p (T_2 - T_1)$$

Choosing an average value of $C_p = 0.4667$ and substituting for $T_2$ and $T_1$:

$$W_1 = 263 \text{ BTU/lb.}$$

Since direct drive is used, the temperature of the vapor entering the turbine, $T_3$, equals $T_2$ and assuming $W_1 = W_2$, the temperature and pressure of the vapor exhausting the turbine $T_4$, $P_4$ equals $T_1$, $P_1$.

Assuming that the independent compressor increases the vapor pressure to an ambient pressure of 1 atm.:

$$T_5 = T_4 (P_5/P_4)^{0.2445}$$

$$T_5 = T_1 (1/P_1)^{0.2445}$$

$$T_5 = 433° \text{ F.}$$

Adopting the equation for flow rate, R, from Example III and substituting for A:

$$R = 2988 Lh\ \Delta T_{LM}/Q_v$$

Substituting $h = 250$ BTU/hr−°F.−ft², $L = 40'$, $T_D = 205°$ F., $\Delta T_{LM} = 151.4°$ F. and $Q_v = 1053$ BTU/lb at 433° F.:

$$R = 107,415 \text{ gal/hr.}$$

Calculating cost using $C_p = 0.4667$ and assuming that the cost to produce energy is about $2.70/1,000,000 BTU, we find:

$$\text{Cost} = C_p (T_5 - T_1) (\$2.70/1,000,000 \text{ BTU})$$

Converting units into gallons and substituting yields:

$$\$/1000 \text{ gal} = \$2.95$$

The present invention has thus far been described in terms of its operation under the preferred conditions wherein the temperature in the boiler, $T_1$, is below the boiling point of the liquid under ambient conditions and the pressure in the boiler, $P_1$, is below ambient pressure. It is anticipated that the vast majority of users will wish to operate under these conditions and, in most circumstances, it is most economical to operate under these conditions. However, there are circumstances where it will be desirable to operate at or above the boiling point of the liquid and at or above ambient pressure. For example, if the raw feed liquid is available from its source at or above its boiling point it may be more economical to operate the system above ambient pressure. In some cases high evaporation temperatures will be beneficial where use of flash distillation apparatus is contemplated. It may also be desirable to employ high temperatures where the influent feed is sea water and a brine pre-heater together with chemical additions to the feed is employed to raise the feed temperature and prevent scaling. However, absent some special circumstance, the present invention is preferably operated between the freezing and boiling point of the raw liquid feed at ambient conditions and at a pressure below ambient pressure.

In those situations where the present invention is to be practiced at or above the boiling temperature of the liquid determined at ambient pressure and at or above ambient pressure, the temperature in the boiler, $T_1$, should be less than about the critical temperature, i.e., the temperature above which the vapor cannot be condensed regardless of the pressure applied thereto, which for water is about 705.47° F. For obvious reasons, as a practical matter, it is unlikely that one would choose to operate at such a high temperature in view of the very substantial equipment and energy costs which would be incurred. However, the system will operate as described herein at any temperature from boiling up to the critical temperature, determined under ambient conditions, provided only that the system parameters, such as compression ratio in the turbine compressor and, if used, in the independent compressor, by-pass percentage in cases where by-pass is employed, and added make-up work, are controlled to assure a temperature differential in the condenser between the vapor in the condenser return line and the raw feed liquid. There should be no difficulty in adjusting the system parameters to assure this temperature differential, although it should be understood that the system may have to operate at something less than optimum, from a cost standpoint, conditions. The boiler temperature will, in most cases be less than about 350° F. and the corresponding pressure, $P_1$, will therefore be a pressure, usually above 1 atm., not exceeding a pressure corresponding to the evaporation temperature under saturated conditions.

Using the same calculational techniques employed in the Examples herein, and selecting $P_5$ above 1 atm. to insure efficient condensation, it can be seen that by appropriate selection of the system parameters, a system can be devised to produce whatever flow rates may be required by the user, it being understood that the greater the flow rate the greater the cost of purification per thousand gallons, all else being equal. Thus, Table III shows some approximate values of flow, R, and cost per thousand gallons for a bypass configuration, as shown in FIGS. 1, 1a and 1b, wherein $T_1$ is selected to be 212° F. and 300° F. at a compression ratio (CR) of 15:1 and where $T_1$ is 250° F. at a compression ratio of 1.12:1. In these instances $P_5$ is arbitrarily selected to be twice $P_1$.

TABLE III

| (°F.) $T_1$ | (°F.) $T_5$ | (°F.) $T_D$ | (°F.) $\Delta T_{LM}$ | CR | atm $P_1$ | atm $P_5$ | BP | (gal/hr) R | $/1000 gal |
|---|---|---|---|---|---|---|---|---|---|
| 212 | 336 | 232 | 57 | 15 | 1.00 | 2.0 | 19.02 | 43,802 | 1.22 |
| 300 | 440 | 320 | 61.7 | 15 | 4.56 | 9.12 | 19.3 | 50,622 | 1.40 |
| 250 | 270 | 256 | 11.6 | 1.12 | 2.03 | 2.27 | 99.4 | 9,108 | 0.20 |

Where the independent compressor configuration of FIG. 15 is used, for a first compressor ratio of 15:1 Table IV shows some approximate values of flow, R, and cost per thousand gallons for a 40' condenser wherein $T_1$ is selected to be 300° F. for a pressure downstream of the independent compressor, $P_5$, selected to be 1 atm. greater than $P_1$. Table IV also shows the cases, for $T_1$=300° F. and 500° F., where the independent compressor ratio is increased so that $P_5$ is four times $P_1$.

TABLE IV

| (°F.) $T_1$ | (°F.) $T_5$ | (°F.) $T_D$ | atm $P_1$ | atm $P_5$ | (°F.) $\Delta T_{LM}$ | (gal/hr) R | $/1000 gal. |
|---|---|---|---|---|---|---|---|
| 300 | 338 | 312 | 4.56 | 5.56 | 22.56 | 18,519 | 0.37 |
| 300 | 606 | 320 | 4.56 | 18.24 | 104.8 | 86,066 | 3.05 |
| 500 | 887 | 520 | 46.33 | 185.32 | 123.9 | 129,592 | 8.00 |

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

We claim:

1. A closed system for high volume distillation of impure liquids comprising:
   (a) evaporator means, including means for supplying impure liquid feed thereto, for evaporating said impure liquid at a temperature above the freezing point of said liquid at ambient pressure and a pressure not exceeding a pressure corresponding to said evaporation temperature under saturated conditions;
   (b) first compressor means receiving said vapor from said evaporator means for increasing said vapor pressure and temperature to predetermined pressure and temperature levels;
   (c) expansion engine means motivated by a portion of said compressed vapor from said first compressor means, said engine being drivingly connected to said compressor means whereby the work done by said vapor in expanding in said expansion engine means is transmitted to said first compressor means;
   (d) conduit means communicating said first compressor means with said expansion engine means for furnishing compressed vapor to said expansion engine means at substantially said predetermined pressure;
   (e) means for supplying make-up work to said expansion engine means, said make-up work supplementing the work done on said engine by said vapor portion expanding therethrough;
   (f) a first mixing chamber for receiving said expanded vapor exhausting from said expansion engine means;
   (g) by-pass duct means for diverting the remainder of said compressed vapor from said first compressor means around said expansion engine means to said first mixing chamber for furnishing compressed vapor to said first mixing chamber at a pressure at least substantially equal to said predetermined pressure, said by-pass duct means including vapor injecting means for injecting said by-pass vapor into said first mixing chamber, said remainder of said compressed vapor admixing with and transferring heat directly to said vapor exiting said expansion engine means to form a second vapor;
   (h) condenser means in heat transfer relationship with said impure liquid feed for receiving said second vapor from said first mixing chamber and for at least partially condensing said second vapor whereby the heat released by said second vapor is transferred to said feed liquid to supply the heat energy necessary for evaporating said feed liquid;
   (i) means for recovering condensate from said condenser means; and (j) means for removing unevaporated liquid feed from said evaporator means.

2. A system, as claimed in claim 1, further including heat exchange means for pre-heating said liquid feed prior to entering said evaporator means.

3. A system, as claimed in claim 1, wherein said condenser means is disposed within said evaporator means in heat transfer relationship with said liquid feed in said evaporator means.

4. A system, as claimed in claim 1, wherein said evaporator means comprises at least one flash chamber and said condenser means comprises at least one heat exchanger for transferring heat between said condensing second vapor and said impure liquid feed whereby said impure liquid feed is heated sufficiently in said heat exchanger that it flashes upon exposure to the reduced pressure in said flash chamber.

5. A system, as claimed in claim 4, wherein said evaporator means comprises a plurality of flash chambers and said condenser means comprises a plurality of heat exchangers.

6. A system, as claimed in claim 5, wherein said flash chambers and said heat exchangers are arranged in series and said flash chambers and said heat exchanger alternate in said series arrangement whereby said feed liquid is alternately heated in a heat exchanger and evaporated at least in part in a flash chamber.

7. A system, as claimed in claim 6, further including pre-heating heat exchange means for pre-heating said liquid feed before it enters said first heat exchanger.

8. A system, as claimed in claim 5, wherein at least one heat exchanger and at least one flash chamber are arranged in series to form a heat-flash combination and a plurality of said heat-flash combinations are arranged in parallel whereby a portion of said impure liquid feed is heated and flashed in each combination.

9. A system, as claimed in claim 1, including means for regulating the vapor pressure in said evaporator means.

10. A system, as claimed in claim 1, including duct means for diverting a portion of said second vapor before said mixture enters said condenser means.

11. A system, as claimed in claim 1, wherein said first compressor means comprises a pair of coaxial compressors, variable clutch means and shaft means drivingly connecting said coaxial compressors through said clutch means.

12. A system, as claimed in claim 1, wherein said first compressor means comprises a pair of compressors arranged in tandem, variable clutch means, each said compressor independently and drivingly connected by a shaft means to said expansion engine means through said clutch means.

13. A system, as claimed in claim 1, wherein said expansion engine means comprises a pair of expansion engines arranged in tandem, variable clutch means, each of said expansion engines independently and drivingly connected via shaft means to said first compressor means through said clutch means.

14. A system, as claimed in claim 1, wherein said first compressor means comprises a centrifugal compressor.

15. A system, as claimed in claim 1, wherein said first compressor means comprises coaxial turbine and centrifugal compressors.

16. A system, as claimed in claim 1, wherein said first compressor means includes a free-wheeling compressor.

17. A system, as claimed in claim 16, wherein said first compressor means comprises a free-wheeling compressor and two turbine compressors downstream therefrom, said turbine compressors are arranged in tandem, each turbine compressor being drivingly connected to an expansion engine.

18. A system, as claimed in claim 1, further including auxiliary turbine means drivingly connected to said first compressor means, said auxiliary turbine means including a conduit for gas flow therethrough, turbine blading in said conduit, said turbine blading drivingly linked to said first compressor means whereby gas flow through said conduit does work on said turbine blading which work is transmitted to said first compressor means.

19. A system, as claimed in claim 18, wherein said conduit is annularly disposed with respect to and separated from the space in which said vapor flows, said first compressor means is drivingly connected to said first expansion engine and said auxiliary turbine means through a shaft, said auxiliary turbine means includes a spindle supporting said blading and drivingly connected to said shaft.

20. A system, as claimed in claim 19, wherein said spindle is hollow and said vapor flows through said spindle.

21. A system, as claimed in claim 19, wherein said gas flowing in said conduit is dirty gas.

22. A system, as claimed in claim 18, further including auxiliary compressor means in said conduit drivingly connected to said auxiliary turbine means, said auxiliary compressor means drawing air through said conduit whereby said air flow together with said gas flow in said conduit motivates said auxiliary turbine means.

23. A system, as claimed in claim 19, including auxiliary compressor means disposed in said annular conduit, said auxiliary compressor means drivingly connected to said auxiliary turbine means through said shaft and including a spindle supporting compressor blading in said conduit.

24. A system, as claimed in claim 23, wherein said spindle is hollow and said vapor flows through said spindle.

25. A system, as claimed in claim 23, wherein said gas flowing in said conduit is dirty gas.

26. A system, as claimed in claim 1, wherein said first compressor means comprises compressor means having a variable compression ratio.

27. A system, as claimed in claim 26, wherein said compression ratio is in the range 1.1:1 to 200:1.

28. A system, as claimed in claim 27, wherein said compression ratio is in the range 5:1 to 100:1.

29. A system, as claimed in claim 28, wherein said compression ratio is in the range 5:1 to 50:1.

30. A system, as claimed in claim 1, including means for controlling the portion of said compressed vapor flow diverted into said by-pass duct means.

31. A system, as claimed in claim 1, wherein said vapor injector means comprise at least one venturi injector.

32. A system, as claimed in claim 1, wherein said means for supplying make-up work comprises a mechanical energy source and means drivingly linking said mechanical energy source to said expansion engine means.

33. A system, as claimed in claim 32, wherein said mechanical energy source is motor means.

34. A system, as claimed in claim 32, wherein said means for supplying make-up work further comprises:

a second mixing chamber for receiving said portion of said vapor from said first compressor means; and
means for supplying hot gases under pressure to said second mixing chamber, said hot gases admixing with and transferring heat directly to said vapor portion from said first compressor means in said second mixing chamber, said resulting first vapor-gas mixture expanding through, doing work upon and motivating said expansion engine means.

35. A system, as claimed in claim 34, wherein said means for supplying hot gases comprises gas supply means and gas injector means, said gas injector means receiving gas from said gas supply means and injecting said gas into said second mixing chamber.

36. A system, as claimed in claim 35, wherein said gas injector means comprise at least one venturi injector.

37. A system, as claimed in claim 34, wherein said expansion engine means is coaxial with said first compressor means and said second mixing chamber is disposed therebetween.

38. A system, as claimed in claim 34, wherein said first vapor-gas mixture admixes with said remainder of said compressed vapor in said first mixing chamber to form a second vapor-gas mixture, said condenser means receiving said second vapor-gas mixture for passing it in heat transfer relationship with said impure liquid feed.

39. A system, as claimed in claim 38, further including duct means for returning a portion of said second vapor-gas mixture to said second mixing chamber.

40. A system, as claimed in claim 1, further including second compressor means receiving said second vapor from said first mixing chamber for increasing the vapor pressure and temperature thereof and means for driving said second compressor means.

41. A system, as claimed in claim 40, wherein said means for driving said second compressor means is a mechanical energy source drivingly linked to said second compressor means.

42. A system, as claimed in claim 40, wherein said means for driving said second compressor means is motor means.

43. A system as claimed in claim 38 further including a second compressor means receiving said second vapor-gas mixture from said first mixing chamber for increasing the vapor pressure and temperature thereof and means for driving said second compressor means.

44. A system, as claimed in claim 43, wherein said means for driving said second compressor means is a mechanical energy source drivingly linked to said second compressor means.

45. A system, as claimed in claim 43, wherein said means for driving said second compressor means is a gas turbine engine.

46. A system, as claimed in claim 43, wherein said means for driving said second compressor means comprises a combustion chamber wherein combustion of fuel and air takes place and combustion gases are produced, means for supplying fuel and air in desired proportions to said combustion chamber; third compressor means for drawing air into said combustion chamber; second expansion engine means motivated by said air and said combustion gases, said second expansion engine means and said third compressor means whereby at least a portion of the shaft work produced by said second expansion engine means is transmitted to said third compressor means to operate said third compressor means, said shaft means also linking said second expansion engine means and said second compressor means.

47. A system, as claimed in claim 46, wherein said means for supplying hot gases to said second mixing chamber comprises gas supply means and gas injector means, said gas injector means receiving gas from said gas supply means and injecting said gas into said second mixing chamber, said system further including duct means connecting the exhaust of said second engine means and said gas injector means, said combustion chamber and said duct means comprising said gas supply means whereby said combustion gases produced in said combustion chamber are ducted to said second mixing chamber for admixture with said vapor therein.

48. A system, as claimed in claim 47, wherein said gas injector means comprise at least one venturi injector.

49. A system, as claimed in claim 47, further including means for sensing the temperature in said second mixing chamber operatively associated with means for controlling flow of combustion gases between said combustion chamber and said second mixing chamber.

50. A system, as claimed in claim 43, further including duct means for returning a portion of said compressed second vapor-gas mixture to said second mixing chamber.

51. A system, as claimed in claim 1, further including duct means upstream of said condenser means and communicating with said evaporator means for diverting a fraction of said second vapor directly to said evaporator means for admixture with said impure liquid feed therein.

52. A system, as claimed in claim 1, further including duct means downstream of said first compressor means for diverting a fraction of said compressed vapor directly to said means for supplying impure liquid feed to said evaporator means.

53. A system, as claimed in claim 52, wherein said means for supplying impure liquid feed includes a feed duct and said duct means downstream of said first compressor means includes a vapor injector means communicating with said feed duct to inject compressed vapor therein.

54. A system, as claimed in claim 40, further including duct means upstream of said condenser means and communicating with said evaporator means for diverting a fraction of said compressed second vapor directly to said evaporator means for admixture with said impure liquid feed therein.

55. A system as claimed in claim 40, further including:
a third mixing chamber downstream of said second compressor means for receiving compressed second vapor therefrom;
second by-pass duct means for diverting a portion of said compressed vapor in said by-pass duct means around said first mixing chamber and said second compressor means to said third mixing chamber, said portion admixing with said compressed second vapor to form a third vapor; and
means for controlling the quantity of compressed vapor entering said first mixing chamber and said third mixing chamber.

56. A system, as claimed in claim 1, wherein said means for supplying make-up work comprises:
a second mixing chamber for receiving said portion of said vapor from said first compressor means; and
means for supplying hot gases under pressure to said second mixing chamber, said hot gases admixing with and transferring heat directly to said vapor portion from said first compressor means in said second mixing chamber, said resulting first vapor-gas mixture expanding through, doing work upon and motivating said expansion engine means.

57. A system, as claimed in claim 56, wherein said means for supplying hot gases comprises gas supply means and gas injector means, said gas injector means receiving gas from said gas supply means and injecting said gas into said second mixing chamber.

58. A system, as claimed in claim 38, further including duct means upstream of said condenser means and communicating with said evaporator means for diverting a fraction of said second vapor-gas mixture directly to said evaporator means for admixture with said impure liquid feed therein.

* * * * *